(12) United States Patent
Sevin et al.

(10) Patent No.: US 12,467,764 B2
(45) Date of Patent: Nov. 11, 2025

(54) ENHANCED REPORTING IN CPM BASED ON LAYERED COST MAP

(71) Applicant: CANON KABUSHIKI KAISHA, Tokyo (JP)

(72) Inventors: Julien Sevin, Saint Aubin du Cormier (FR); Eric Nassor, Thorigne-Fouillard (FR); Brice Le Houerou, Acigne (FR); Isabelle Morvan, Chantepie (FR); Hervé Ruellan, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 18/052,167

(22) Filed: Nov. 2, 2022

(65) Prior Publication Data
US 2023/0194297 A1    Jun. 22, 2023

(30) Foreign Application Priority Data

Nov. 4, 2021 (GB) ...................................... 2115846

(51) Int. Cl.
*G01C 21/00* (2006.01)
*G08G 1/16* (2006.01)
*H04W 4/40* (2018.01)

(52) U.S. Cl.
CPC ................ *G01C 21/3807* (2020.08)

(58) Field of Classification Search
CPC ........ G01C 21/3807; H04W 4/40; G08G 1/16
USPC ....................................................... 701/409
See application file for complete search history.

(56) References Cited

U.S. PATENT DOCUMENTS

| | | |
|---|---|---|
| 10,373,494 B1 | 8/2019 | Krysiuk |
| 10,841,761 B2 | 11/2020 | Zhang et al. |
| 2011/0298603 A1 | 12/2011 | King et al. |
| 2019/0268447 A1 | 8/2019 | Yang et al. |
| 2019/0325751 A1 | 10/2019 | Altintas et al. |
| 2019/0339082 A1* | 11/2019 | Doig .................. G01C 21/3848 |
| 2020/0164844 A1 | 5/2020 | Jung et al. |
| 2021/0067926 A1* | 3/2021 | Hwang ................. H04W 4/023 |
| 2021/0082210 A1 | 3/2021 | Sakr |
| 2021/0129862 A1 | 5/2021 | Kim |
| 2022/0005353 A1 | 1/2022 | Hwang et al. |

(Continued)

FOREIGN PATENT DOCUMENTS

| | | |
|---|---|---|
| EP | 3691300 A1 | 8/2020 |
| EP | 3829200 A2 | 6/2021 |

(Continued)

OTHER PUBLICATIONS

Intelligent Transport System (ITS); Vehicular Communications; Basic Set of Applications; Specification of the Collective Perception Service, ETSI TS 103 324 V0.0.18 (May 2020).

(Continued)

*Primary Examiner* — Tyler D Paige
(74) *Attorney, Agent, or Firm* — Canon U.S.A., Inc. IP Division

(57) ABSTRACT

A communication method for an Intelligent Transport System (ITS) comprising at least one first transmitting ITS station, the method taking place at the first transmitting ITS station including transmitting a second Collective Perception Message (CPM) comprising at least one identifier of a first element previously transmitted in a first CPM, the first element being not present in the second CPM.

14 Claims, 14 Drawing Sheets

(56) References Cited

U.S. PATENT DOCUMENTS

| | | | |
|---|---|---|---|
| 2022/0103986 A1 | 3/2022 | Hwang et al. | |
| 2022/0132524 A1* | 4/2022 | Mueck | H04W 72/1215 |
| 2022/0150333 A1* | 5/2022 | Nylander | H04L 69/326 |
| 2022/0332350 A1* | 10/2022 | Jha | H04W 4/46 |

FOREIGN PATENT DOCUMENTS

| | | |
|---|---|---|
| GB | 2611540 A | 4/2023 |
| JP | 2008015316 A | 1/2008 |
| JP | 2011158636 A | 8/2011 |
| JP | 2018530810 A | 10/2018 |
| JP | 2018534692 A | 11/2018 |
| JP | 2021522604 A | 8/2021 |
| WO | 2018100661 A | 6/2018 |
| WO | 2020145438 A1 | 7/2020 |
| WO | 2020/257642 A1 | 12/2020 |
| WO | 2021252174 A1 | 12/2021 |

OTHER PUBLICATIONS

Intelligent Transport Systems (ITS); Communications Architecture, ETSI EN 302 665 V1.1.1 (Sep. 2010).

Intelligent Transport Systems—Communications access for land mobiles (CALM)—Architecture, ISO 21217, second Edition, Apr. 1, 2014.

Intelligent Transport System (ITS); Vehicular Communications; Basic Set of Applications; Specification of the Collective Perception Service, ETSI TS 103 324 V0.0.20 (Feb. 2021).

Intelligent Transport Systems (ITS); Vehicular Communications; Basic Set of Applications; Analysis of the Collective Perception Service (CPS); Release 2; ETSI TR 103 562 V2.1.1 (Dec. 2019).

Intelligent Transport System (ITS); Vehicular Communications; Basic Set of Applications; Specification of the Collective Perception Service; ETSI TS 103 324 V0.0.22 (May 2021).

Intelligent Transport System (ITS); Vehicular Communications; Basic Set of Applications; Part 2: Specification of the Awareness Basic Service, ETSI EN 637-2 V1.4.1, (Jan. 2019).

Intelligent Transport Systems (ITS); Vehicular Communications; Basic Set of Applications; Part 3: Specifications of Decentralized Environmental Notification Basic Service, ETSI EN 302 637-3 V1.3.1 (Apr. 2019).

Intelligent Transport Systems (ITS); Vehicular Communications; Basic Set of Applications; Facilities layer protocols and communication requirements for infrastructure services, ETSI TS 103 301 V1.3.1 (Feb. 2020).

Car 2 Car Communication Consortium, Triggering Conditions and Data Quality Pre-Crash Information, XP093024322.

Intelligent Transport Systems (ITS); Vehicular Communications; Basic Set of Applications; Part 2: Specification of Cooperative Awareness Basic Service; ETSI EN 302 637-2 v1.4.1; (Apr. 2019).

\* cited by examiner

ENHANCED REPORTING IN CPM BASED ON LAYERED COST MAP

PRIORITY CLAIM/INCORPORATION BY REFERENCE

This application claims the benefit under 35 U.S.C. § 119(a)-(d) of United Kingdom Patent Application No. 2115846.4, filed on Nov. 4, 2021 and entitled "Enhanced reporting in cpm based on layered cost map". The above cited patent application is incorporated herein by reference in its entirety.

FIELD OF THE DISCLOSURE

The present disclosure relates generally to Intelligent Transport Systems (ITS) and more specifically to Cooperative Intelligent Transport Systems (C-ITS).

BACKGROUND OF DISCLOSURE

Cooperative Intelligent Transport Systems (C-ITS) is an emerging technology for future transportation management that aims at improving road safety, traffic efficiency and drivers experience.

Intelligent Transport Systems (ITS), as defined by the European Telecommunications Standards Institute (ETSI), include various types of communication such as:
  communications between vehicles (e.g., car-to-car), and
  communications between vehicles and fixed locations (e.g., car-to-infrastructure).

The use of ITSs is not restricted to road transport as such, as they also include the use of information and communication technologies (ICT) for rail, water and air transport, including navigation systems.

In general, the various types of ITS rely on radio services for communication and use dedicated technologies.

ITS standards define a general architecture, specified in ETSI EN 302 665 and ISO 21217, and also define in particular the notion of ITS stations (also denoted ITS-S). ITS stations may be any vehicles, Road Side Units (RSU), Vulnerable Road Users (VRU) carrying an ITS device (for instance, the ITS device may be included in a smartphone, a GPS, a smart watch or in a cyclist device), any other entities or infrastructures equipped with an ITS device, and central subsystems (back-end systems and traffic management centres).

In order to properly operate, ITSs may support various types of communications, for instance between vehicles (vehicle-to-vehicle (V2V), which refers in general to all kinds of road users, e.g., car-to-car) or between vehicles and fixed locations (vehicle-to-infrastructure (V2I) and infrastructure-to-vehicle (I2V), e.g., car-to-infrastructure). As ITSs are not restricted to road transportation, ITSs may also support communication dealing with information related to rail, water and air transport, including navigation systems.

ITS aims at making vehicles, infrastructure and other users to cooperate by exchanging messages (also called ITS messages) between the ITS stations. ITS messages are not encrypted. Such exchanges of messages are performed through wireless networks, referred to as V2X networks (for "vehicle" to any kind of devices "X"). Examples of Such V2X networks may include 3GPP LTE-Advanced Pro, 3GPP 5G and IEEE 802.11p technology.

With the integration of sensors in the vehicles, in Road Side Units or wearables by VRUs, ITS stations may also have information regarding their local environment. Such information may be provided by embedded sensors, such as optical sensors and cameras.

An awareness service, known as Cooperative Awareness Service in the standard ETSI TS 103 324, enable the stations to share their local environment as perceived through their sensors.

Such a service allows the reporting of description information of objects detected by onboard sensor systems embedded in ITS stations, and also free space where no object has been detected. The detected objects are referred to as perceived objects thereafter.

Data exchange of this service is made through the use of ITS messages referred to as Collective Perception Messages (CPM).

At the moment, as specified in the standard ETSI TS 103 324, the detected objects and free spaces are reported individually, using individual containers.

Such reporting is extremely detailed with a complete description of the position and the kinematic of each perceived object, and the dimensions of a free space.

Such individual reporting may be limited in some situations.

For example, when a large number of objects are present in the environment of an ITS station, the ITS station may use several CPMs to report the perceived objects. Indeed, the CPM size is limited in view of the limited bandwidth of the ITS network. Therefore, the individual reporting including a substantial amount of data may require more than one CPM to fully report the environment of the ITS station.

Therefore, there exists a need to develop a new CPM format ensuring a minimal reporting of several perceived objects, while ensuring, through a new reporting mechanism, that precise information provided by individual reporting may be used to complete the minimal reporting.

SUMMARY OF THE DISCLOSURE

The present disclosure has been devised to address one or more of the foregoing concerns.

A first aspect of the present disclosure is directed to a communication method for an Intelligent Transport System (ITS) comprising at least one first transmitting ITS station, the method comprising at the first transmitting ITS station:
  transmitting a second Collective Perception Message (CPM) comprising at least one identifier of a first element previously transmitted in a first CPM, the first element being not present in the second CPM.

Correspondingly, the first aspect of the present disclosure provides a transmitting station of an Intelligent Transport System, ITS, the station comprising a processor configured to:
  transmitting a second Collective Perception Message (CPM) comprising at least one identifier of an element previously transmitted in a first CPM and not present in the second CPM.

According to some embodiments, the first element may be of a first element type and the second CPM may comprise a second element of a second element type, the second element comprising the identifier of the first element and information related to the first element.

According to some embodiments, one among the first and the second element types may provide a global description of an area of interest and the other element type may provide an individual description of at least one object perceived by the transmitting ITS station within the area of interest.

According to some embodiments, the type of element providing a global description of an area of interest may be a layered cost map container, and wherein the type of element providing an individual description may be a perceived object container and/or a free space addendum container.

According to some embodiments, the first CPM may be transmitted by the first transmitting ITS station.

According to some embodiments, the first CPM may be transmitted by a second transmitting ITS station of the ITS.

According to some embodiments, the transmitting of one or more first CPM may be implemented according to an independent reporting mechanism given by a predetermined reporting policy and a predetermined inclusion procedure.

According to some embodiments, the transmitting of one or more second CPM may be implemented according to a dependent reporting mechanism given by a reporting policy and an inclusion procedure, the dependent reporting mechanism being dependent on a previously sent first CPM.

According to some embodiments, the transmitting of the second CPM may depend on a confidence level associated with the first element and a confidence level of an element of the second CPM associated with the at least one identifier.

According to some embodiments, the communication method may further comprise at the first transmitting ITS station:
  receiving, from the second transmitting ITS station, the first CPM comprising at least the first element;
  retrieving at least one perceived object and/or at least one free space perceived by sensors of the first transmitting ITS station;
  determining one or more confidence levels associated with the retrieved at least one perceived object and/or the at least one free space; and
  whether the confidence level of the first element is less than the one or more confidence levels of the at least one perceived object and/or the at least one free space, transmitting a second CPM including a second element relating to the retrieved at least one perceived object and/or the at least one free space associated with the at least one identifier.

According to some embodiments, the first element may be a layered cost map container comprising a layered cost map, the layered cost map being regularly divided into cells having associated cost values.

According to some embodiments, the first element may be a layered cost map container comprising a layered cost map, the layered cost map being regularly divided into cells having associated cost values, and wherein the layered cost map may comprise either a discrepancy Handling Layer indicating discrepancies of one or more cost values with a previously received layered cost map from another transmitting ITS station, or a Collaboration Request Layer requesting collaboration from other ITS transmitting stations for determining at least one cost value of the layered cost map.

According to some embodiments, each cost value may be associated with a confidence level. The communication method may further comprise at the first transmitting ITS station:
  receiving, from the second transmitting ITS station, the first CPM;
  whether the first element comprises either a Discrepancy Handling Layer or a Collaboration Request Layer, retrieving at least one perceived object and/or at least one free space perceived by sensors of the first transmitting ITS station;
  identifying the retrieved perceived object and/or free space which has a same location as cells for which discrepancy is indicated in the Discrepancy Handling Layer or for which a collaboration is requested in the Collaboration Request Layer;
  transmitting a second CPM including a second element relating to the identified at least one perceived object and/or the at least one free space associated with the at least one identifier.

According to some embodiments, the layered cost map may be associated with a first identifier and the cells are implicitly identified according to a predetermined order with a set of second identifiers, such that the at least one identifier comprises the first identifier and one second identifier among the set of second identifiers.

According to some embodiments, an element of the second CPM may comprise at least one perceived object or free space associated with the at least one identifier.

According to some embodiments, the first element may comprise at least one perceived object and/or free space respectively associated with a first and a second identifier.

According to some embodiments, the element of the second CPM may comprise a layered cost map container comprising a layered cost map, the layered cost map being regularly divided into cells having associated cost values, and wherein each cell is associated with either the first identifier or the second identifier.

A second aspect of the present disclosure is directed to a communication method for an Intelligent Transport System (ITS) comprising at least one transmitting ITS station and one receiving ITS station, the method comprising at the receiving station:
  receiving a first CPM comprising a first element of a first type identified by one identifier associated with the first element;
  storing the first element and the associated identifier;
  receiving a second CPM comprising a second element of a second type comprising the identifier of the first element and information related to the first element
  updating the first element using the information related to the first element comprised in the second element.

Correspondingly, the second aspect of the present disclosure provides a receiving station of an Intelligent Transport System, ITS, the station comprising a processor configured to:
  receiving a first CPM comprising a first element of a first type identified by one identifier associated with the first element;
  storing the first element and the associated identifier;
  receiving a second CPM comprising a second element of a second type comprising the identifier of the first element and information related to the first element
  updating the first element using the information related to the first element comprised in the second element.

According to some embodiments, the first element may be either a perceived object container or a free space container and the second element may be a layered cost map container.

According to some embodiments, the first element may be a layered cost map container and the second element may be either a perceived object container or a free space container.

According to some embodiments, the at least one identifier may comprise one first identifier associated with the layered cost map and a second identifier among a set of second identifiers each being associated with a cell of the layered cost map.

A third aspect of the present disclosure is directed to a computer program product for a programmable apparatus, the computer program product comprising a sequence of instructions for implementing a method as described previously, when loaded into and executed by the programmable apparatus.

A fourth aspect of the present disclosure is directed to a computer-readable storage medium storing instructions of a computer program for implementing a method as described previously.

A fifth aspect of the present disclosure is directed to a Collective Perception Message (CPM) comprising a Layered Cost Map Container including information relating to a layered cost map, wherein the layered cost map container further comprises a field for indicating an identifier of the layered cost map contained in the layered cost map container.

According to some embodiments, the layered cost map container may comprise several fields for indicating the identifiers of the cells of the layered cost map contained in the layered cost map container.

The fifth aspect of the present disclosure further provides a Collective Perception Message (CPM) comprising a perceived object container and/or a free space addendum container including information relating to respectively a perceived object and/or a perceived free space, wherein the perceived object container or the free space addendum container further comprise a field for referencing an identifier of a layered cost map.

The fifth aspect of the present disclosure further provides a Collective Perception Message (CPM) comprising a perceived object container and/or a free space addendum container including information relating to respectively a perceived object and/or a perceived free space, wherein the perceived object container and the free space addendum container further comprise a field for referencing the identifier of respectively the perceived object or the perceived free space.

The fifth aspect of the present disclosure further provides a Collective Perception Message (CPM) comprising a layered cost map container including information relating to a layered cost map, wherein the layered cost map container further comprises two fields respectively for referencing an identifier of respectively a perceived object or a perceived free space.

Another aspect of the present disclosure relates to a computer program product for a programmable apparatus, the computer program product comprising a sequence of instructions for implementing any method as defined above, when loaded into and executed by the programmable apparatus.

Another aspect of the present disclosure relates to a computer-readable storage medium storing instructions of a computer program for implementing any method as defined above.

At least parts of the methods according to the present disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer-readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present disclosure will become apparent to those skilled in the art upon examination of the drawings and detailed description. Embodiments of the present disclosure will now be described, by way of example only, and with reference to the following drawings, in which.

DETAILED DESCRIPTION OF THE DISCLOSURE

The names of the lists and elements (such as data elements) provided in the following description are only illustrative. Embodiments are not limited thereto and other names could be used.

The embodiments of the present disclosure are intended to be implemented in an Intelligent Transportation Systems (ITS).

The present disclosure provides a reporting mechanism combining two types of reporting, one type being an independent reporting mechanism in which the transmitting of CPMs, referred to as I-CPMs, is governed by a predetermined reporting policy and inclusion procedure of CPMs, and the other type being a dependent reporting mechanism for which reporting policy and inclusion procedure of CPMs, referred to as P-CPMs, fully depend on previously sent I-CPM.

Both I-CPM and P-CPM may comprise information comprised within an element of either a first type or of a second type. When the I-CPMs comprise an element of the first type, the P-CPMs comprise an element of the second type and vice versa.

The element of the first type comprises an individual reporting, using dedicated containers within the CPM for each perceived object and/or free space. The element of the second type comprises a multiple reporting, using a dedicated container to report a perceived area. Such a dedicated container may enable the reporting of multiple information relating to the area, for example the presence of objects within the area.

The content of the I-CPM is processed independently whereas the content of the P-CPM is processed with respect to the content of the lastly sent I-CPM, in order to update the content of the lastly sent I-CPM.

The core idea is to combine these two types of reporting together with these two types of elements in order to reduce the amount of data transmitted, while ensuring that the stations of the ITS have sufficient information to take decisions.

Therefore, a first type of reporting is scheduled according to predetermined conditions of reporting policies, and a second type of reporting is performed whenever the predetermined conditions of reporting policies are not fulfilled.

In order to ensure that two types of reporting may be used in a complementary way when received by other ITS stations, the reporting of the first type may comprise enhanced identifiers to identify reported information relating to a given element. Thus, the reporting of the second type, referring to the same element, may include the same identifier.

Thus, the present disclosure provides an enhanced format of CPM, including additional identifier, referred to as enhanced identifiers.

Such invention may limit the risk of network overhead, by limiting the size of CPM relating to multiple reporting, while ensuring the provision to ITS stations of minimal data for them to take decision within the ITS.

Figure 1:
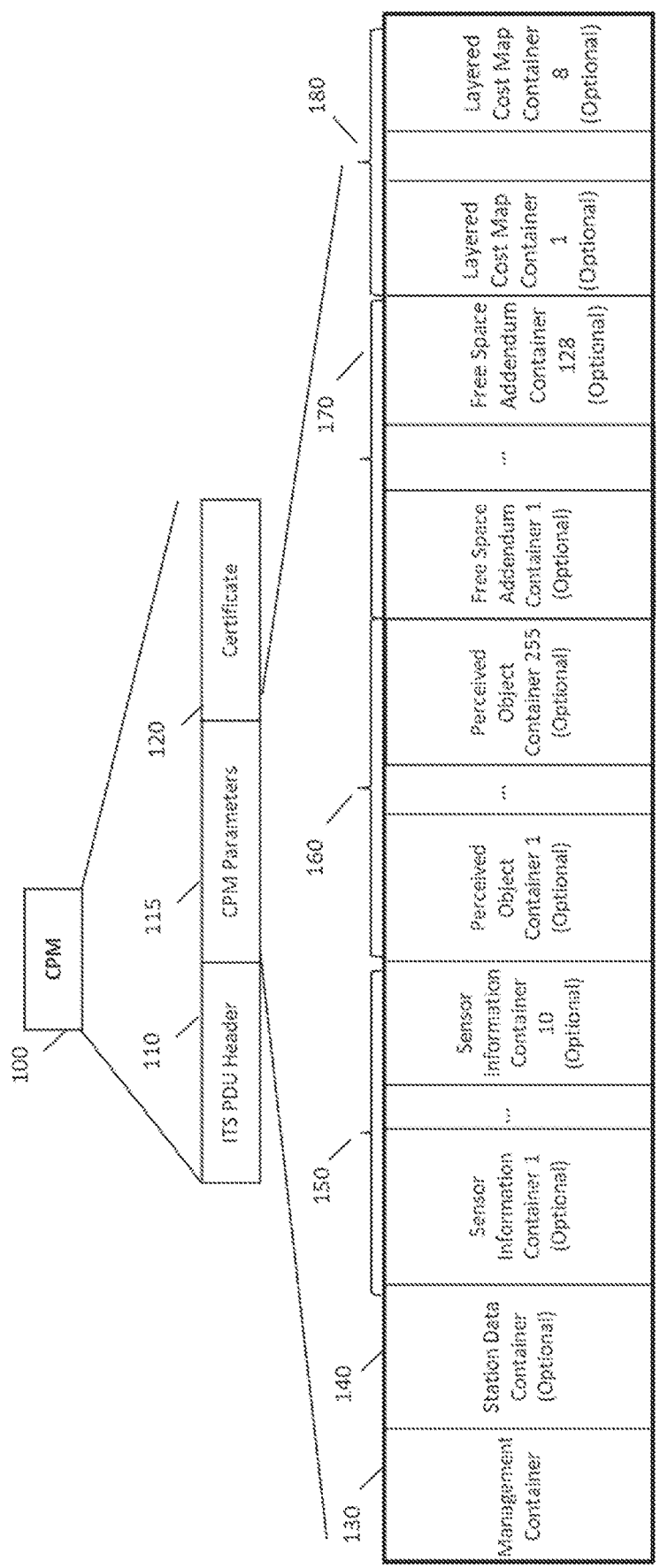
FIG. 1 illustrates an example of a structure of a Collective Perception Message.

FIG. 1 illustrates an example of a structure of a Collective Perception Message to be used in the context of the present disclosure.

The CPM 100 is a packet data unit (PDU) used by the ITS stations for sharing information relating to their local environment. The illustrated CPM structure is based on the CPM format as specified in version 0.0.20 of the ETSI TS 103 324 specification and the CPM format described in submission DTS/ITS-00167 [Intel].

The CPM 100 may be used by the transmitting ITS stations to share their perceived environment with receiving ITS stations. In other words, the CPMs are sent by the transmitting ITS stations, and comprise information about their surrounding environment retrieved from their respective perception sensors. The ITS transmitting station sending a CPM may also be referred to as the originating station or the transmitting station.

The CPM 100 comprises an ITS PDU header 110, a "CPM Parameters" field 115 and a Certificate 120.

The "CPM Parameters" field 115 may contain a Management Container 130 and/or a Station Data Container 140 and/or one or more optional Sensor Information containers (SIC) 150 and/or one or more optional Perceived Object Containers (POC) 160 and/or one or more optional Free Space Addendum Containers 170. Alternatively to the Perceived Object Containers 160 and/or Free Space Addendum Containers 170, the "CPM Parameters" field 115 may contain one or more optional Layered Cost Map Containers 180.

The Management Container 130 may contain information regarding the type of station from which the CPM originated. For example, the Management Container 130 may indicate whether the originating station is a vehicle, RSU or the VRU.

The Station Data Container 140 is an optional field whose content may depend on whether the originating ITS station is fixed or mobile.

In cases where the originating ITS station is mobile, the Station Data Container 140 is mandatory. The Station Data Container 140 may contain dynamic information of the originating ITS station. For example, the dynamic information may comprise one or several of the following: speed, direction, longitudinal and/or lateral and/or vertical acceleration, yaw rate, pitch/roll angles, etc.

In cases where the originating ITS station is fixed, the Station Data Container 140 is optional. The Station Data Container 140 may provide references to the identification number of the originating ITS station. Such identification number is provided by the fixed ITS station to the rest of the ITS network using MAP (road/lane topology and traffic maneuver message) Extended Message (MAPEM).

The Sensor Information Container 150 may be used to provide information about the sensory capabilities (e.g., position, type of the sensors) for each given sensor of the originating ITS station. For example, Sensor Information Container 150 may comprise the type of sensor (e.g. camera, infrared camera, radar, radio, etc.), the covered area (e.g. a polygon on a map representing the area observable through the given sensor). Depending on the station type of the transmitting ITS station, different container specifications are available to encode the properties of a sensor. The Sensor Information Containers are attached at a lower frequency than the other containers, as defined in ETSI TR 103 562. A CPM may comprise up to ten Sensor Information Containers 150.

Information relating to perceived objects and/or free spaces and a given area covered by the sensors, may be provided in the CPM using two types of element.

The first type of element is provided to report individually each object detected by the sensors and/or free space perceived by the sensors. The first element comprises therefore a Perceived Object Container (POC) 160 and/or the Free Space Addendum Container 170. For each entity detected individually through the embedded sensors of the originating ITS station, either a Perceived Object Container 160 or a Free Space Addendum Container 170 may be used.

The Perceived Object Container 160 may comprise a sequence of Data Frames (DFs) comprising one or more Data Elements (DEs), which give a detailed description of the dynamic state and properties of the perceived object.

The DEs may comprise the following information:

- an identifier of the detected object in the DE referred to as objectID DE;
- a time of measurement in the DE referred to as timeOfMeasurement DE. The time of measurement corresponds to the time difference between the measurement time of the detection of the perceived object and the generation time of the Management Container 130;
- an object confidence in the DE referred to as objectConfidence DE. The object confidence indicates a level of confidence associated with the perceived object, and more generally the level of confidence associated with the provided information relating to the perceived object. The determination of the object confidence is described in section 7.6.4 of ETSI TS 103 324 (0.0.22).
- a reference point in the DE referred to as objectRefPoint DE. The reference point may be a chosen point of the perceived object. By default, the reference point is the centre point of the perceived object;
- a distance between the originating ITS station and the perceived object. The distance may be determined according to a frame of reference fixed to the originating ITS station. For example, the distance is determined relatively to three directions x, y, z of the frame of reference, such that the distance is indicated within three xDistance, yDistance, zDistance DEs representing together the distance between the perceived object and the originating ITS station's reference point at the time of measurement with a given level of confidence. This level of confidence is specific to the determined distance;
- a speed with respect to the originating ITS station's reference point at the time of measurement. Similarly to the distance, the speed may be determined relatively to the fixed frame of reference of the originating ITS station. For example, the speed is determined relatively to three directions x, y, z of the frame of reference such that the speed is indicated within three xSpeed, ySpeed, zSpeed DEs representing together the speed of the detected object with a given level of confidence. This level of confidence is specific to the determined speed;
- an acceleration with respect to the originating ITS station's reference point at the time of measurement. Similarly to the distance, the acceleration may be determined relatively to the fixed frame of reference of the originating ITS station. For example, similarly to the speed, the acceleration is indicated within three xAcceleration, yAcceleration, zAcceleration DEs relatively to the three directions of the frame of reference fixed to the originating ITS station with a given confidence;
- a dynamic Status in the DE referred to as dynamicStatus DE, providing the capabilities of the originating ITS station to move away from the perceived object.
- a dimension indicating the dimensions of the perceived object. The dimension may be determined within the fixed frame of reference relating to the originating ITS station, and may be indicated using three DEs (planarObjectDimension1, planarObjectDimension2, verticalObjectDimension); and
- a classification in the DE referred to as Classification DE, providing the classification of the perceived object. Such classification may be an indication of whether the perceived object is part of a given class according to one or more predetermined rules. For example, in the Classification DE, it may be indicated whether the perceived object is a vehicle, a fixed ITS within a RSU, a VRU, etc.

The Free Space Addendum Container 170 may provide information regarding a free space detected by one of the embedded sensors. A Free Space Addendum Container 170 may therefore provide measurements regarding the free space perceived by one of the sensors.

A Free Space Addendum Container 170 may comprise a sequence of data frames (DFs) comprising one or more data elements (DEs), which give a description of each detected free space.

The DFs and DEs may comprise the following descriptive information:

- the free space area in a DF referred to as freeSpaceArea DF, which describes the free space area. Such description may comprise the dimensions of the free space area expressed relatively to the three directions x, y, z of the frame of reference fixed to the originating ITS station. For example, the free space area may be either represented as either a polygonal area (AreaPolygon DF), or a circular area (AreaCircular DF), or an elliptical area (AreaEllipse DF), or a rectangular area (AreaRectangle DF);
- the free space confidence in the DE referred to as FreeSpaceConfidence DE, which describes an isotropic level of confidence that applies to the entire free space area;
- a list of sensor identifiers in the DEs referred to as sensorIDList DEs, which provides a list of pseudonym sensor IDs which performed the measurements for identifying the free space; and
- a shadowing field, referred to as shadowingApplies DE, indicating whether the simple shadowing mechanism applies within the free space area.

The second type of element may be the Layered Cost Map Container 180 providing information of each layered cost map to be reported.

Figure 2:
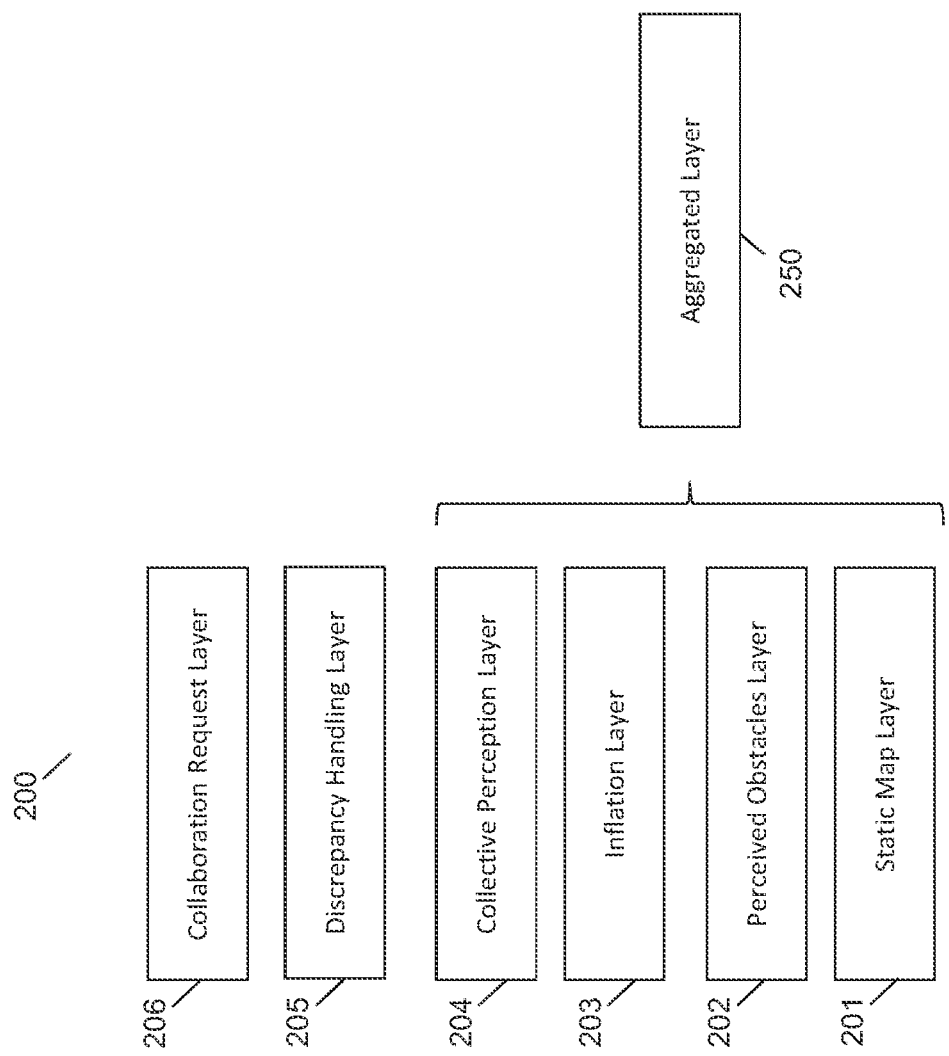
FIG. 2 illustrates a layered cost map which may be used in a Cooperative Transportation System (C-ITS)

An exemplary data structure of a layered cost map, which may be contained in the Layered Cost Map Container 180, is illustrated in FIG. 2.

A layered cost map 200 is a 2D grid-based representation of an area perceived by the embedded sensors of a given station, referred to as ego ITS station. The area is a part of or is the perceived Field of View, which is the totality of the area perceived by the embedded sensors in the ego ITS station.

The layered cost map 200 comprises a set of cells. The cells may be rectangular, and preferably of the same size.

Each cell is associated with a cost value. The cost value may indicate information relative to the perceived objects and/or the free space for each cell.

For instance, a cost value may correspond to an occupation state (free, occupied, unknown), a safety state (safe/caution/lethal) a number of objects, or a confidence level corresponding to the provided cost values.

A layered cost map may comprise one or more cost map layers. Each cost map layer is a 2D grid-based representation of the same area as the one of the layered cost map 200, similarly divided into cells, and having cost values related to a specific functionality and/or sensor type.

The cost map layers may be of different types. In the illustrated example, the layered cost map 200 is made up of the ordered cost map layers 201, 202, 203, 204, 205 and 206, each one corresponding to a type of cost map layer. As an alternative, the layered cost map may comprise more or fewer cost map layers.

The Static Map Layer 201 is a predetermined cost map layer indicating the static objects/obstacles located within the represented area. The Static Map Layer 201 aims at indicating the static environment of the represented area, such as the road, traffic light, road sides, etc. Such a layer is predetermined as it may be evaluated using MAPEMs sharing information relating to the road topology. The cost values of the Static Map Layer 201 depends on the presence, within the cells, of static objects/obstacles of the represented area.

The Perceived Object Map Layer 202 is a cost map layer in which the cost values indicate the presence or the absence of objects perceived by the onboard sensors of the ego ITS station in the cells of the represented area. The perceived object, unlike the static objects/obstacles, may be mobile.

The Inflation Map Layer 203 is a cost map layer in which the cost values indicate buffer zones around the static obstacles and the perceived objects. The buffer zone is a predetermined safety zone defined around the static obstacles and the perceived objects, taking into consideration braking time.

The Collective Perception Map Layer 204 is a cost map layer in which the cost values indicate the perceived object whose information has been received from one or more neighbouring ITS stations through ITS messages as Cooperative Awareness Message (CAM) or CPM. Such a layer may be constructed using the layered Cost Map Layers included in the received CPM from neighbouring ITS stations.

An Aggregated Map Layer 250 may be generated from the layers 201,202,203 and 204.

An Aggregated Map Layer 250 may be constructed by aggregating the Static Map Layer 201, the Perceived Object Map Layer 202, the Inflation Map Layer 203 and the Collective Perception map Layer 204. More specifically, the information of the Static Map Layer is first incorporated in the Aggregated Map Layer followed by adding respectively information from Perceived Object Layer 202, Inflation Map Layer 203 and Collective Perception Layer 204.

The Discrepancy Handling Layer 205 is a cost map layer in which the cost values indicate the discrepancies between the cost values of the Aggregated Cost map 250 of the ego ITS station and the cost values of the other Aggregated Cost Maps 250 received from a neighbouring ITS station. The cost of a Discrepancy Handling Layer for a given cell is coded on 1 bit and it is set to 0 if a discrepancy has been identified, 1 otherwise.

The Collaboration Request layer 206 is a cost map layer in which cost values indicate the cells of the Aggregated Cost Map Layer 250 for which the ego ITS station requests collaboration from a neighbouring ITS station as the ego ITS station considers that one or more cost values have a low confidence level.

A confidence level indicates whether or not the cost values of the Aggregated Cost map Layer 250 are reliable, and considered as safe. It allows the ego ITS station to request its neighbouring ITS stations to transmit the corresponding cost values. The cost value of a Collaboration Request layer for a given cell is coded on 1 bit and it is set to 1 to indicate an unsafe cost, 0 otherwise.

Back to FIG. 1, such a layered cost map may be reported within the CPM 100, particularly using the Layered Cost Map Container 180.

The Layered Cost Map Container 180 may comprise a LayeredCostMapContainer DF which may include one or more of the following items of description information:

the descriptive information relating to the represented area. According to some embodiments the represented area is a rectangular area of specified dimensions in its Field of View to share with the neighbouring ITS stations. The rectangular area may be further divided into smaller rectangular cells.

The descriptive information of the rectangular represented area may be comprised in a DF referred to as ReportedCostMapGridArea DF as part of the LayeredCostMapContainer DF. The number of cells may be specified in a DE referred to as sizeofReportedGridArea DE in which the length and the width of the rectangular area are indicated in terms of the number of cells, nGridCellsSizeLength DE and nGridCellsSizeWidth DE.

the descriptive information relating to the size of the cells of reported rectangular grid. The descriptive information of the cells may be provided in DEs referred to as GridCellSizeX and GridCellSizeY DEs.

the descriptive information relating to the center of the reported rectangular grid area. It may be specified with respect to the reference position of the ego ITS station.

the descriptive information relating to each cost map layer included in a DF referred to as LayeredCostMapContainer DF. For example, it may comprise:

the number of cost map layers included in LayeredCostMapContainer is specified by NumberOfLayeredCostMap DE.

the rectangular grid area used by all reported cost map layers is specified by ReportedCostMapGridArea DF.

the cost values of each reported cost map layer is provided in a LayeredCostMap DF, for each reported cost map layer.

the type of each reported cost map layer is specified in the CostMapLayerType DE, the time of measurement of each reported cost map layer is specified using the TimeOfMeasurement DE; and the list of the map cells of each reported cost map is specified through a sequence of PerGridCellCostMapValueWithConfidenceLevel DFs, each PerGridCellCostMapValueWithConfidenceLevel DF corresponding to a map cell. The PerGridCellCostMapValueWithConfidenceLevel comprises:

A PerGridCellCostMapValueWithConfidenceLevel DF which comprises a PerGridCellCostValue DE, indicating the cost value of the map cell, and a PerGridCellConfidenceLevel DE indicating a level of confidence regarding the provided cost value of the map cell. The cost and confidence level of cells can be specified in different formats. Several formats may be specified, for cost and confidence levels respectively, using PerGridCellCostValueConfigType and PerGridCellConfidenceLevelConfigType DEs.

Map cells may be assigned to implicit identifiers, for identifying the map cells. For example, the map cell may be identified using the position of its descriptive information within the PerGridCellCostMapValueWithConfidenceLevel DF comprising sequentially the descriptive information of the map cell.

For example, the identifier of a map cell may be determined with a predetermined rule.

For instance, a map cell located in the $i^{th}$ row and the $j^{th}$ column may be assigned the following identifier: i×nGridCellsSizeWidth+j.

As an alternative, the map cells may be associated with explicit identifiers.

Maps cells identifiers are referred to as LCCELLId hereinafter.

Therefore, the CPMs may comprise one or more containers of these two elements, either the Perceived Object Containers 160 and/or the Free Space Addendum Containers 170 or the Layered Cost Map Container 180, to share information about the local environment of the station.

Both elements have their advantages and their drawbacks.

Using the Perceived Object Containers 160 and/or the Free Space Addendum Containers 170 enables the originating ITS station to share precise information relating to its local environment. However, containers may not be suitable when the originating ITS station is surrounded by a lot of objects, for example. Indeed, the size of the CPM in terms of Perceived Object Containers 160 and/or Free Space Addendum Containers 170 may not exceed a predetermined threshold. Therefore, several CPMs may be used by such an originating ITS station to fully report its local environment, when the number of detected objects and/or free spaces exceeds the predetermined threshold.

Using the Layered Cost Map Containers 180, it is possible to now report an area, and the presence or absence of objects in the area, using a grid with cell representation. Yet, the provided information remains rough. Indeed, for some decisions, the ITS stations may need for example information regarding the motion of detected objects.

Moreover, the bandwidth of the ITS is limited. Indeed, further to the periodic messages, such as the CAM used by ITS stations to share their own information, MAPEM, the ITS may support the intensive exchange of CPMs. There is therefore a need to optimise the use of the bandwidth of the ITS.

The present disclosure therefore provides an enhanced reporting mechanism involving two types of reporting, and using an enhanced CPM format which includes enhanced identifiers within the Perceived Object Containers, the Free Space Addendum Containers and the Layered Cost Map Containers.

Figure 3:
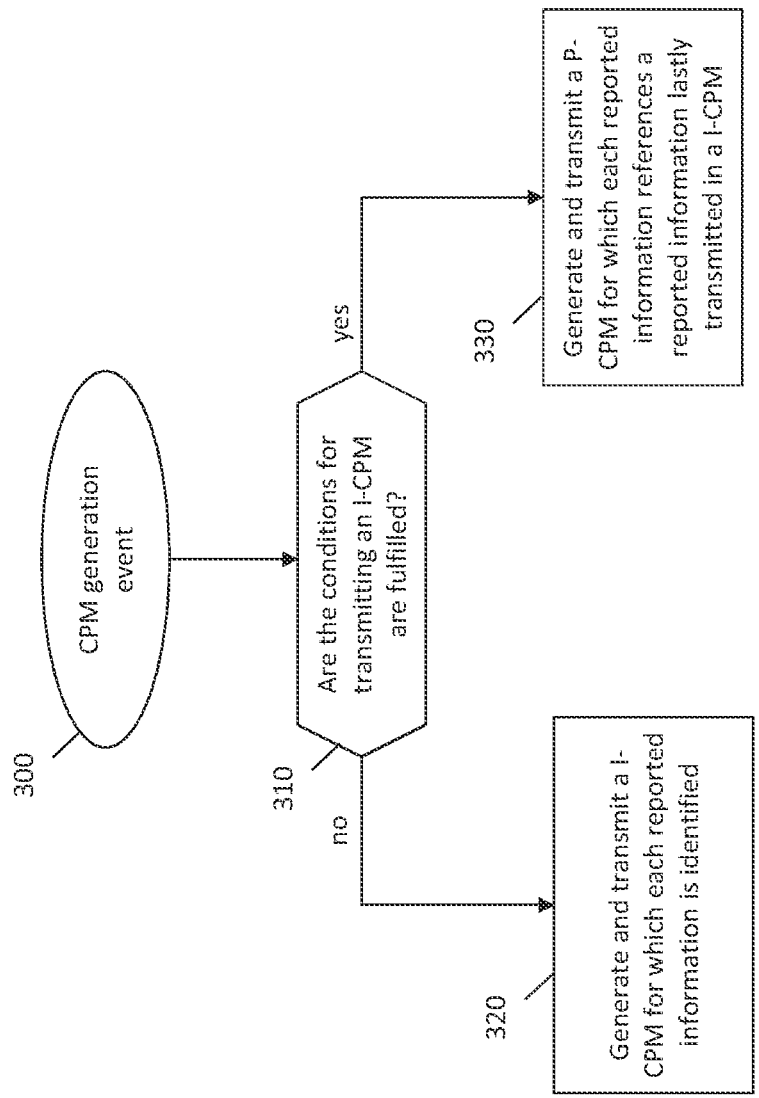
FIG. 3 illustrates a flowchart of an example of an enhanced reporting procedure involving two complementary types of reporting at a transmitting station, according to the present disclosure.
Figure 4:
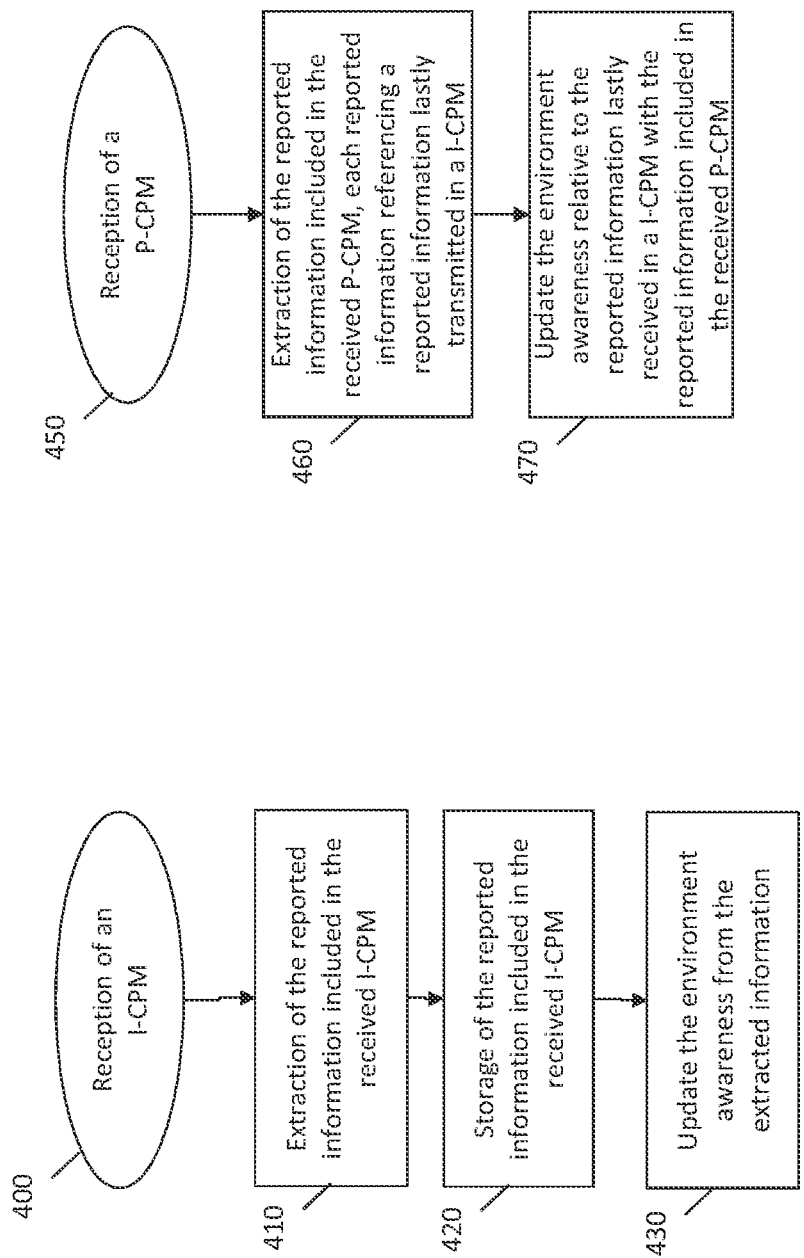
FIG. 4 illustrates a flowchart of an example of the enhanced reporting procedure involving two complementary types of reporting at a receiving station, according to the present disclosure.

FIG. 3 and FIG. 4 both illustrates, using flowcharts, an example of an enhanced reporting procedure involving two complementary types of reporting at transmitting and receiving stations, according to the present disclosure.

As mentioned before, the present disclosure is based on two types of reporting, using an enhanced CPM.

A first type of reporting, using CPMs referred to as I-CPMs, is an independent reporting mechanism in which the sending of I-CPMs is governed by a predetermined reporting policy. For example and without limitation, the I-CPMs may be transmitted periodically on the bases of a given period of time.

For example, the predetermined reporting policy may depend on the elements comprised in the I-CPM: in other words, the predetermined reporting policy may depend on whether the I-CPMs report individual perceived objects and/or free spaces, or on whether the I-CPMs a report layered cost map.

In cases where the I-CPMs are CPMs include one or more Perceived Object Containers and/or Free Space Addendum Containers 170, the reporting policy is the same as that specified in the standard ETSI TS 103 324.

As specified in the standard, the generation of a CPM to be transmitted relies on the generation of a CPM event as specified in section 6.1.3.1 (refer to CP Message generation frequency management of the ETSI TS 103 324 (0.0.22).

In the current version of the standard, a CPM may contain perceived Object Containers 160 and/or Free Space Addendum Containers 170 (in addition to Management container).

More specifically, the current version of the standard includes specific inclusion procedures. Specific inclusion procedures specify the inclusion of the perceived Object Containers in section 6.1.3.2 and the inclusion of the Free Space Addendum Containers in section 6.1.3.4.

The inclusion procedure of the perceived Object Containers comprises a set of specified conditions, referred to as perceived Object Inclusion conditions. In particular, a perceived Object Container comprising updated information relating to a previously perceived object is included in the next CPM to be transmitted if one of the following conditions is met:

the updated information of the perceived object has first been detected after the last CPM event generation, or the Euclidian absolute distance between the lastly reported position and the current updated position of the reference point of the perceived object exceeds a predetermined threshold, minReferencePointPositionChangeThreshold, or the elapsed time since the last time the object was reported exceeds a predetermined threshold T_GenCpmMax.

The inclusion procedure of the Free Space Addendum Containers comprises a set of specified conditions, referred to as Free Space Inclusion conditions. In particular, a Free Space Addendum Container comprising updated information relating to a previously perceived free space is included in the next CPM to be transmitted if one of the following conditions is met:

In cases where the free space area corresponds to a polygon area, a Free Space Addendum Container may be added to the current CPM if the Euclidian relative distance between the vertices of the polygon relative to the corresponding vertices of this polygon lastly included in a CPM exceeds 4 m or if the number of vertices to describe the polygon changes.

In cases where the free space area corresponds to a circular area, or an elliptical area or a rectangular area, a Free Space Addendum Container may be added to the current CPM if the difference between the current Euclidian distance of the center point of the described free space area and the Euclidian distance of the center point of the same described free space area and lastly included in a CPM exceeds 4 m. Further, a Free Space Addendum Container may be added to the current CPM if the difference between the current radius or length of the described free space area and the Radius or length of the same described free space area lastly included in a CPM exceeds 4 m. Additionally, a Free Space Addendum Container may be added to the current CPM if the difference between the current orientation of the described free space area and the orientation of the same described free space area lastly included in a CPM exceeds 4 degrees.

In cases where the I-CPM are CPMs including one or more Layered Cost Map Containers, the reporting policy is the same as that specified in submission DTS/ITS-00167 [Intel].

In this submission, the generation of a CPM to be transmitted is the same as that specified in the standard ETSI TS 103 324 (0.0.22).

In addition, the submission DTS/ITS-00167 [Intel] has specified a specific Layered Cost Map Container Inclusion procedure to include an updated Layered Cost Map in the next CPM to be transmitted, when the Layered Cost Map lastly reported in a CPM is considered outdated.

The Layered Cost Map Container Inclusion procedure comprises a set of specified conditions, referred to as Layered Cost Map Inclusion conditions. In particular, an updated Layered Cost Map is included in the next CPM to be transmitted if one of the following conditions is met:
- the percentage of map cells whose cost values or/and the confidence levels are updated compared to the lastly reported CPM, is higher than a predetermined threshold, minPercentageOfCellsChangeThreshold; or
- the time elapsed since the last time the layered cost map layer was included in a CPM exceeds a predetermined time period, T_GenCpmMax.

A second type of reporting, using CPMs referred to as P-CPMs, for which reporting policy and inclusion procedure fully depend on previously sent I-CPM. Therefore, the sending of P-CPM depends on whether the conditions for sending a new I-CPM are fulfilled according to the reporting policy and the inclusion procedure. If the conditions are not met, P-CPMs are generated and the inclusion procedure of P-CPMs is thus based on the information reported in the previously (or lastly) sent I-CPM.

Therefore, P-CPMs of the second reporting may comprise information referring to information previously reported in the previously sent I-CPM, in order to update information by the previously sent I-CPM. Reference may be made using enhanced identifiers, in both I-CPM and P-CPM.

In the present disclosure, I-CPMs include elements of the first type and P-CPMs include elements of the second type, or conversely. In the reporting mechanism provided, I-CPMs and P-CPMs comprises different type of elements with respect to a given area of interest. Thus, provided information with I-CPMs may be updated, before the next to be transmitted I-CPM, using provided information within the P-CPM.

The use of the identifiers in both I-CPMs and P-CPMs enables to update the element of the I-CPM using the element of the P-CPM without having to transmit an updated version of the entire first element.

In order to ensure that P-CPMs are sent between two successive I-CPMs, values of the predetermined threshold may be chosen accordingly. In other words, in the context of the present disclosure, the value of the fields minPercentageOfCellsChangeThreshold and T_GenCpmMax, when the Layered Cost Map Container Inclusion procedure is applied, or the value of the fields minReferencePointPositionChangeThreshold and T_GenCpmMax, when the perceived Object Containers Inclusion procedure is applied, may be increased compared to values used outside the context of the present disclosure.

The general principle of the present disclosure will be better understood with reference to FIGS. 3 and 4.

Part of the enhanced reporting procedure is performed at a transmitting ITS station, which transmits CPMs, as illustrated in FIG. 3.

The method starts at the generation of a CPM event, at step 300. As explained hereinbefore, all types of CPM generation event are specified in ETSI TS 103 324 and will not be detailed in this document.

At step 310, it is checked at the transmitting ITS station whether the conditions for transmitting an I-CPM are fulfilled. In other words, whether the conditions of the reporting policy relating to the perceived Object Containers and/or Free Space Addendum Containers or the reporting policy relating to Layered Cost Map Container are fulfilled.

When the conditions for transmitting an I-CPM are fulfilled an I-CPM is generated and transmitted at step 320. The I-CPM comprises reported information within elements such that each reported item of information is identified, using for example an enhanced identifier.

When the conditions for transmitting an I-CPM are not fulfilled, a P-CPM is generated and transmitted at step 330. The P-CPM comprises reported information within elements, each information item referencing the previously reported information item within the lastly sent I-CPM.

The P-CPM comprises one type of element referencing another type of element comprised within the lastly sent I-CPM. In other words, the element present in the I-CPM is not present in the P-CPM.

References are made using the enhanced identifier used in the previously sent I-CPM.

The other part of the enhanced reporting procedure is performed at a receiving ITS station, which receives P-CPMs and I-CPMs, as illustrated in FIG. 4.

The processing at the receiving ITS station is illustrated separately depending on whether an I-CPM or the P-CPM is received.

When an I-CPM is received, at step 400, reported information within one type of element, are extracted from the received I-CPM at step 410.

Then, at step 420, the extracted reported information is stored. The information is stored together with the enhanced identifiers.

At step 430, the environment awareness is updated using the extracted information at step 410.

When a P-CPM is received, at step 450, reported information within the other type of elements, are extracted from the received P-CPM at step 460. Each reported information item, comprised within the P-CPM, comprises references to a previously reported information item of the lastly received I-CPM, using the enhanced identifiers.

Next, at step 470, the environment awareness based on the reported information of the lastly received I-CPM is then updated, using the reported information included in the received P-CPM.

More specifically, the reported information included in the received P-CPM references the reported information from lastly received I-CPM, using the enhanced identifiers. Such enhanced identifiers may help to determine which reported information to update.

To better understand the present disclosure, four embodiments are now described in relation to the following Figures.

Figure 5:
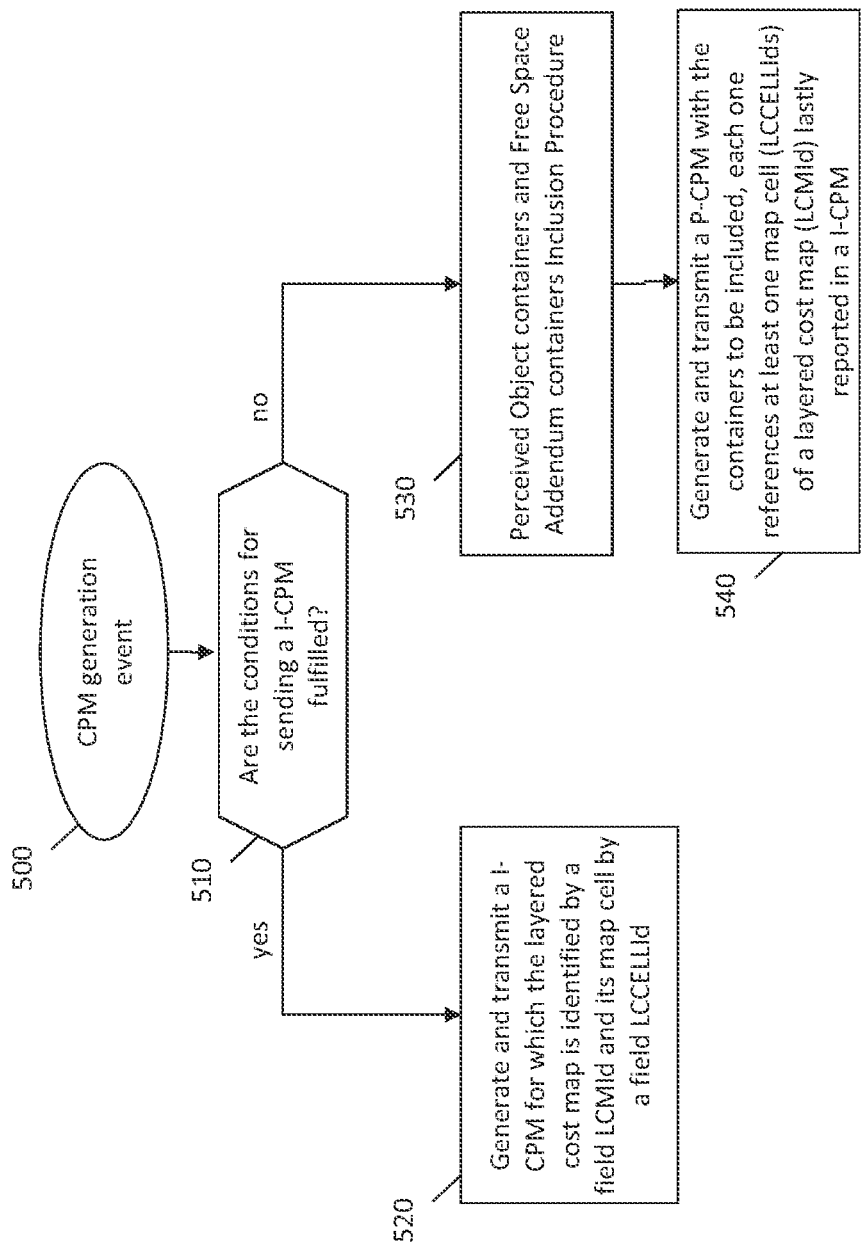
FIG. 5 illustrates a flowchart of an example of an enhanced reporting procedure involving two complementary types of reporting at a transmitting station, according to a first embodiment.
Figure 6:
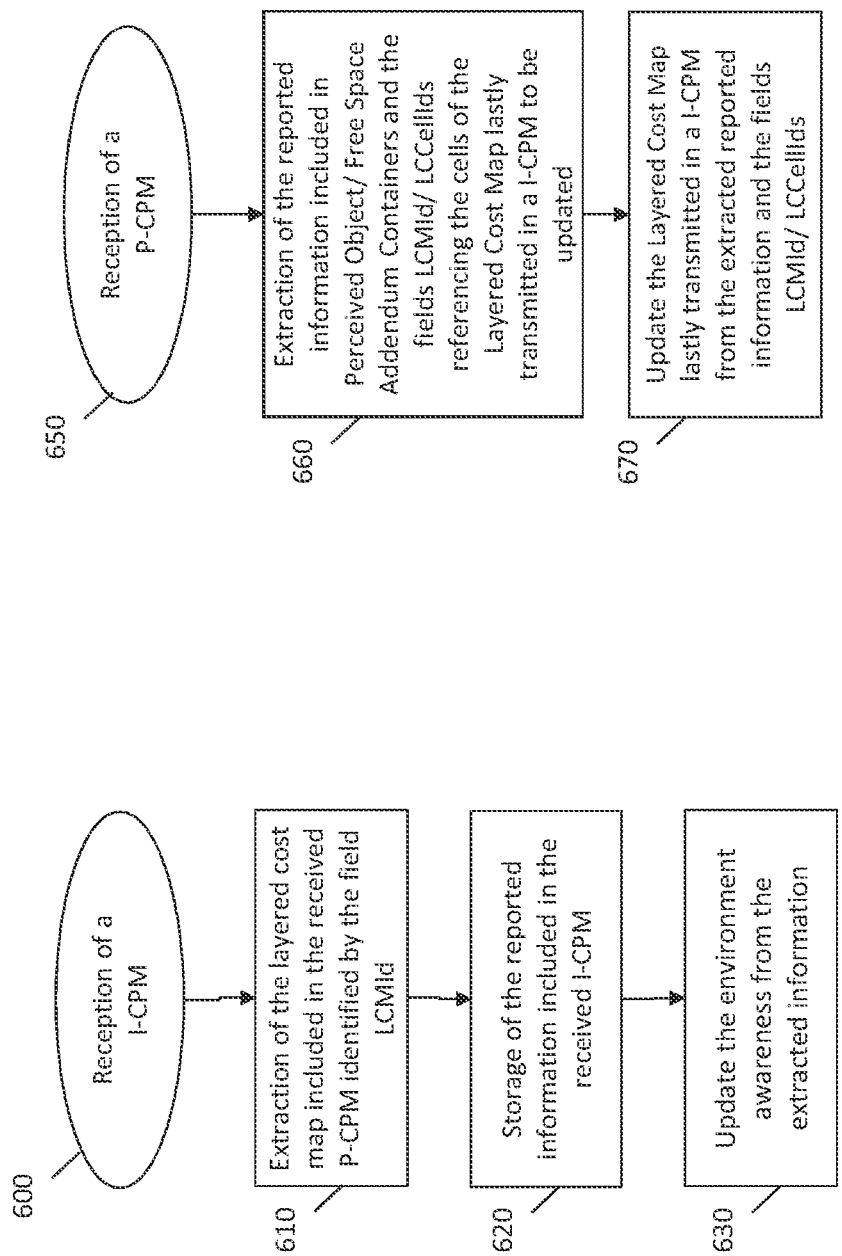
FIG. 6 illustrates a flowchart of an example of the enhanced reporting procedure involving two complementary types of reporting at a receiving station, according to the first embodiment.

FIG. 5 and FIG. 6 illustrate a flowchart of an example of an enhanced reporting procedure at the transmitting and receiving stations, according to a first embodiment.

In this first embodiment, an I-CPM and a P-CPM are provided, the I-CPM comprising at least one layered cost map, and the P-CPM comprising at least one individually reported perceived object and/or free space referring to one or more cells of one of the reported layered cost map of the I-CPM.

Such embodiment enables the provision of ITS stations with minimal information for taking decisions using I-CPMs sent according to predetermined reporting policy, while providing, between two successive I-CPMs, a P-CPM including more detailed information relating to the provided minimal information.

First, an example of the enhanced reporting procedure at the transmitting station according to the first embodiment is described in relation to FIG. 5.

The method starts at the generation of a CPM event, at step 500. At step 510, it is checked whether the conditions for sending an I-CPM are fulfilled. As the I-CPMs contain at least one layered cost map, reporting conditions relate to Layered Cost Map. More specifically, Layered Cost Map Inclusion conditions are considered.

When the conditions for transmitting an I-CPM are fulfilled, then at step 520, an I-CPM is generated and transmitted. The I-CPM comprises at least one Layered Cost Map Container comprising a layered cost map associated with at least one enhanced identifier.

In this embodiment, the at least one enhanced identifier may comprise an identifier LCMId associated with the layered cost map. Typically, the value LCMId is an integer between 0 and 256 not yet assigned.

In this embodiment, the at least one enhanced identifier may also comprise an identifier, referred to as LCCELLId, linked to the map cells of the layered cost map. As explained hereinbefore, the LCCELLId identifiers may be implicit.

Therefore, at this step, the Layered Cost Map Container is generated with a field LCMId DE set to the value of the identifier LCMId, in addition to the DFs and DEs describing the Layered Cost map as detailed hereinbefore.

When the conditions for transmitting an I-CPM are not fulfilled, it is checked at step 530 whether conditions to transmit a P-CPM are fulfilled.

An enhanced Perceived Object and/or Free Space Inclusion Procedure is therefore launched in order to identify the Perceived Object Containers and Free Space Addendum Containers to be included in the P-CPM.

The conditions of the enhanced Perceived Object and/or Free Space Inclusion Procedure to include a container among the following: If a perceived object, respectively a free space, modifies the value of at least one map cell of the layered Cost Map reported in the lastly sent I-CPM, a Perceived Object Container, respectively a Free Space Addendum Container, is generated.

Next, at step 540, accordingly to the conditions of the enhanced Perceived Object and/or Free Space Inclusion Procedure, a P-CPM is generated and transmitted a P-CPM with Perceived Object Containers and/or Free Space Addendum Containers.

In this case, in addition to the complete description of the position and the kinematic of the perceived object, respectively the description of the free space, the Perceived Object Container, respectively a Free Space Addendum Container, comprises a field referred to as LCMId DE which is set to the identifier of the layered cost map reported in the last I-CPM, and one or more fields, referred to as LLCELLIds DE, which are set to the list of the map cell identifiers to be updated in the reported layered Cost Map in the lastly sent I-CPM.

An example of method for the enhanced reporting procedure at the receiving station according to the first embodiment will now be described in relation to FIG. 6.

The processing at the receiving ITS station is illustrated separately depending on whether an I-CPM or a P-CPM is received.

When an I-CPM is received, at step 610, the layered cost map contained within the I-CPM together with its identifier, included in the field LCMId, are extracted.

Next, at step 620, the extracted layered cost map and its identifier LCMId, are stored together. Thus, reference can be made to this extracted layered cost map, and to its cells using the implicit identifiers LLCELLIds.

At step 630, the environment awareness is updated using the extracted layered cost map and its descriptive information.

When a P-CPM is received, at step 650, reported information within the Perceived Object and/or Free Space Addendum Containers are extracted. Thus, further to descriptive information, the Perceived Object and/or Free Space Addendum Containers contain one or more couples of LCMId field and LCCellIds field referencing the cells of the reported layered cost map reported in the lastly received I-CPM.

Thanks to these pairs of identifiers, the receiving ITS station is now able to update the cells of the layered cost map of a previously received I-CPM using Perceived Object and/or Free Space Addendum Containers of the P-CPM.

Thus, at step 670, the stored Layered Cost Map is updated.

For each Perceived Object container, the update operation is divided in two steps. In a first step, the field LCCellIds is extracted and each cell for which its identifier is contained in the field LCCellIds is updated. A first update comprises the reinitialising of the cost values of the cells concerned by considering no perceived object in the cell. In a second step, the reported position of the perceived objects is processed in order to identify the list of the map cells to be updated. For each identified cell, a second update comprises the updating of the cost value of the identified cells according to the reported position and kinematic state of the perceived object.

For each Free Space Addendum Container, only the first update is performed for updating the Layered Cost Map. There is no need to use the freeSpaceArea DF to update a Layered Cost Map.

Figure 7:
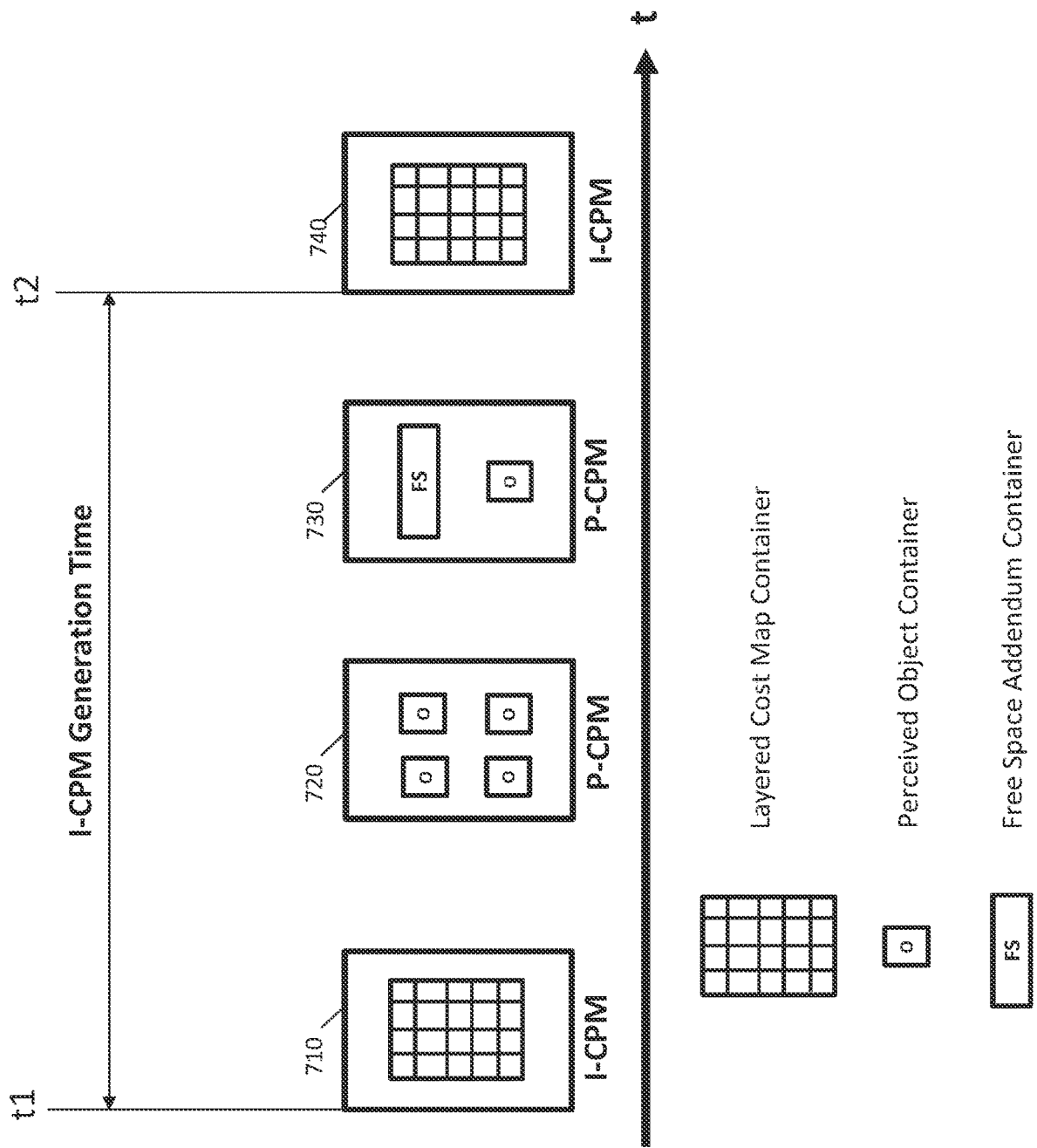
FIG. 7 illustrates the example of the enhanced reporting procedure in a Cooperative Transportation System, according to the first embodiment.

FIG. 7 illustrates the example of the enhanced reporting procedure in a Cooperative Transportation System, according to the first embodiment.

I-CPMs 710, 740 are sent according to the reporting policy of the I-CPM, at two successive instants t1 and t2. The period of time between these two instants may be referred to as an I-CPM Generation time.

Both I-CPMs 710, 740 comprise a layered cost map so that the I-CPM Generation time depends on whether the conditions for sending an I-CPM corresponding the Layered Cost Map Inclusion conditions are fulfilled, as described at step 510.

During the I-CPM Generation time, i.e. the time lapse between t1 and t2, P-CPMs may be generated in order to update the layered cost reported in the I-CPM 710 at time t1.

In the illustrated example, two P-CPMs 720, 730 are generated.

The first P-CPM 720 contains four Perceived Object containers and the second P-CPM 730 contains two Perceived Object containers and one Free Space Addendum container.

Each container references the layered cost map reported in the I-CPM 710 at time t1, and the identifiers of the map cells of the layered cost map to be updated.

Figure 8:
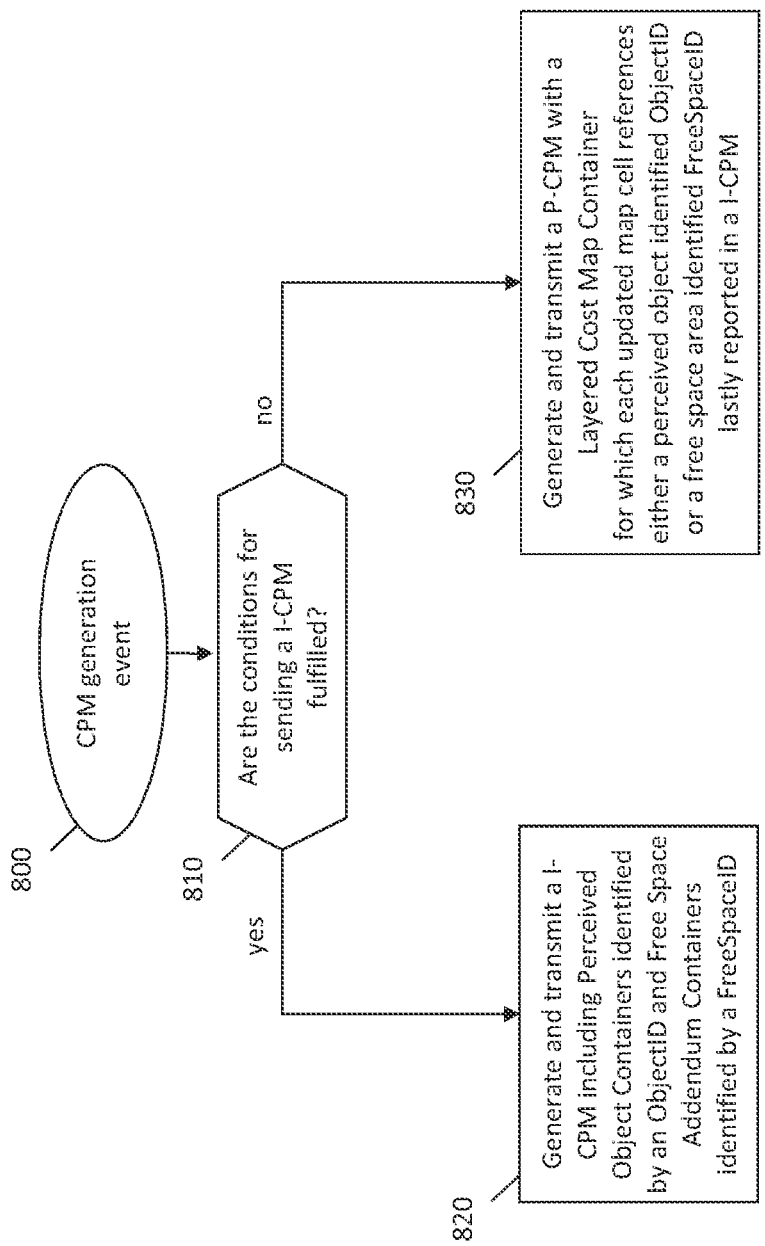
FIG. 8 illustrates a flowchart of an example of an enhanced reporting procedure involving two complementary types of reporting at a transmitting station, according to a second embodiment.
Figure 9:
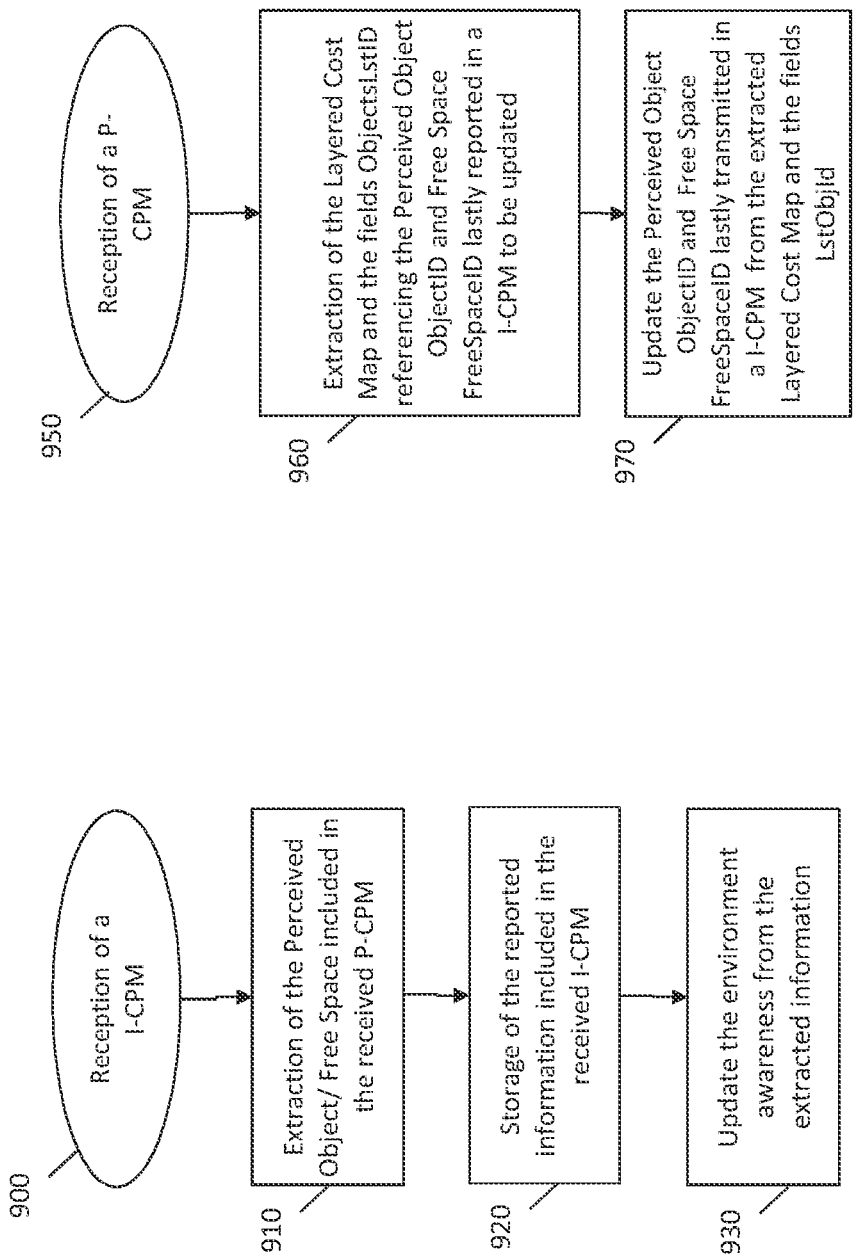
FIG. 9 illustrates a flowchart of an example of the enhanced reporting procedure involving two complementary types of reporting at a receiving station, according to the second embodiment.

FIG. 8 and FIG. 9 illustrate a flowchart of an example of an enhanced reporting procedure at the transmitting and receiving stations, according to a second embodiment.

In the second embodiment, an I-CPM and a P-CPM are provided, the I-CPM comprising at least one individually reported perceived object and/or free space, and the P-CPM comprising at least one layered cost map including one or more cells referring to the individually previously reported perceived object and/or free space.

In this embodiment, the reported perceived object and/or free space may be respectively associated with a first identifier and a second identifier, which may be used in the P-CPM to associate the cells of the layered cost map with the reported perceived object and/or free space.

Such an embodiment enables updating a perceived object and/or free space, mainly their position in the layered cost map between two successive I-CPMs. Such a reporting mechanism may be particularly advantageous, particularly when a lot of objects are present within the local environment of the transmitting station. Such updates using P-CPMs including layered cost map enables updating of the position of several perceived objects without risking the overhead of the ITS communication network.

First, an example of method for the enhanced reporting procedure at the transmitting station according to the second embodiment is described in relation to FIG. 8.

The method starts at the generation of a CPM event, at step 800. At step 810, it is checked whether the conditions for sending an I-CPM are fulfilled. As the I-CPM contains at least one Perceived Object and/or Free Space Addendum Container, the reporting conditions relate to the Perceived Object and/or Free Space Addendum Containers. More precisely, the Perceived Object and/or Free Space Inclusion conditions are considered.

When the conditions for transmitting an I-CPM are fulfilled, a list of Perceived Object containers and Free Space Addendum containers to be included is identified.

Next, at step 820, a P-CPM including at least one Perceived Object Container and/or Free Space Addendum Container is generated and transmitted. The P-CPM comprises within each Perceived Object Container and/or Free Space Addendum Container, fields with the descriptive information and a new field objectID DE or respectively FreeSpaceID DE, in which a first or second identifier of either the perceived object of the free space is indicated. For example, the value of the first identifier indicated within objectID DE and/or the value of the second identifier indicated within FreeSpaceID DE is an integer between 0 and 256 not yet assigned to both free space or perceived objects.

Therefore, at this step, the Perceived Object Container and/or Free Space Addendum Container is generated with a field ObjectID DE and/or FreeSpaceID DE set to the value of the identifier ObjectID and/or FreeSpaceID in addition to with the DFs and DEs describing the perceived object and/or free space as detailed hereinbefore.

When the conditions for transmitting an I-CPM are not fulfilled, a Layered Cost Map Container is then generated comprising, further to a layer cost map, for each map cells, a field comprising an identifier referencing the perceived objects and/or free spaces, previously identified in the lastly sent I-CPM, to be updated.

Such information, i.e. the identifiers referencing either the perceived objects or free spaces, are reported in a new field ObjectsLstID DE of the PerGridCellCostMapValueWithConfidenceLevel DF describing each map cell.

In this case, in addition to a layered cost map reporting an area perceived by the ITS transmitting station, the Layered Cost Map Container comprises several fields ObjectsLstID set to the identifier(s) of a reported perceived object and/or free space in the lastly sent I-CPM, such that provided information within the layered cost map are to be used for updating the position of the perceived objects and/or free spaces.

An example of the enhanced reporting procedure at the receiving station according to the second embodiment will now be described in relation to FIG. 9.

The processing at the receiving ITS station is illustrated separately depending on whether an I-CPM or the P-CPM is received.

When an I-CPM is received, at step 900, reported information within the Perceived Object and/or Free Space Addendum Containers of the I-CPM is extracted together with an associated identifier, comprised the fields either objectID DE or FreeSpaceID DE.

Then at step 920, the Perceived Object and/or Free Space Addendum Containers and its identifiers objectID and/or FreeSpaceID, are together stored at the transmitting station. Thus, reference can be made to this perceived object and/or free space using these identifiers in the next P-CPMs.

Next, at step 930 the environment awareness is updated using the extracted perceived object and/or free space and the descriptive information.

When a P-CPM is received, at step 950, reported information within the Layered Cost Map container are extracted. In particular, for each cell of the layered cost map, the cost and the ObjectsID or FreeSpaceID are retrieved, such that the perceived objects and/or free spaces lastly reported in the last I-CPM are referenced in P-CPM.

Thanks to the identifiers, the receiving ITS station is now able to update the perceived objects and/or free spaces of a previously received in the I-CPM using cells of the layered cost map of the P-CPM.

Thus, at step 970, the stored information relating to the perceived object and/or free space is updated.

Next, the cost values of the cells, relating to each object of the ObjectsLstID which references elements reported in the lastly sent I-CPM, is used to update associated perceived object and/or free space.

If the element is a perceived object identified by its ObjectID identifier, its position and its kinematic is updated using the cost of the cells referencing this perceived object with the identifier ObjectID.

If the element is a free space identified by its FreeSpaceID identifier, its geographical area is updated using the cells referencing this perceived free space with the identifier FreeSpaceID.

Figure 10:
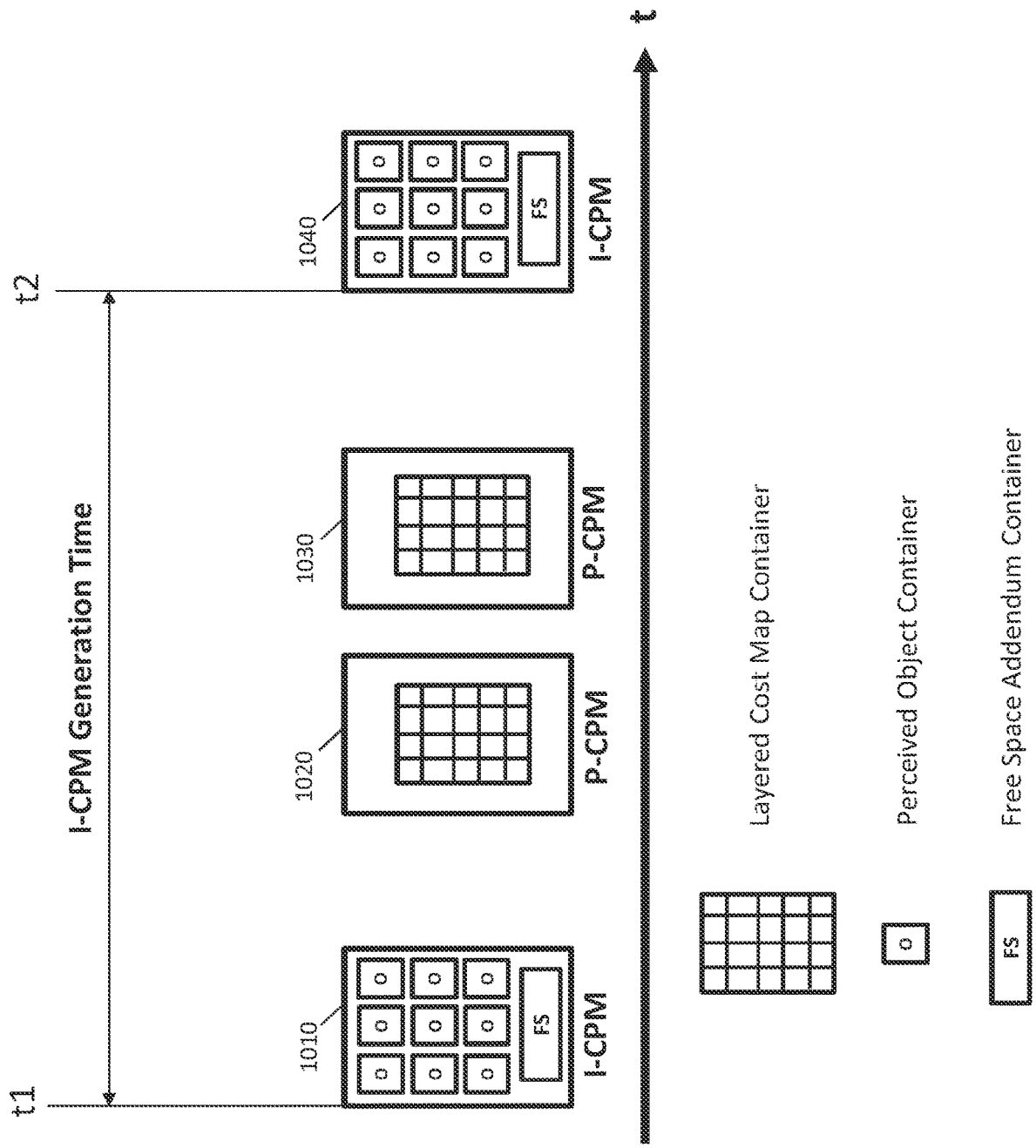
FIG. 10 illustrates the example of the enhanced reporting procedure in a Cooperative Transportation Systems, according to the second embodiment.

FIG. 10 illustrates the example of the enhanced reporting procedure in a Cooperative Transportation Systems, according to the second embodiment.

I-CPMs 1010, 1040 are sent according to the reporting policy of the I-CPM, at two successive instants t1 and t2. The period of time between these two instants may be referred to as an I-CPM Generation time.

Both I-CPMs 1010, 1040 comprise one or more Perceived Object Containers and/or Free Space Addendum Containers so that the I-CPM Generation time depends on whether the conditions for sending a I-CPM corresponding to the perceived Object and/or Free Space Inclusion conditions are fulfilled at step 810.

During the I-CPM Generation time, i.e. the time lapse between t1 and t2, some P-CPMs may be generated in order to update the layered cost reported in the I-CPM 1010 at time t1.

In the illustrated example, two P-CPMs 1020, 1030 are generated.

The first P-CPM 1020 and the second P-CPM 1030 each contain a Layered Cost Map container which references the identifiers of the perceived objects and free spaces reported in the I-CPM to be updated.

Figure 11:
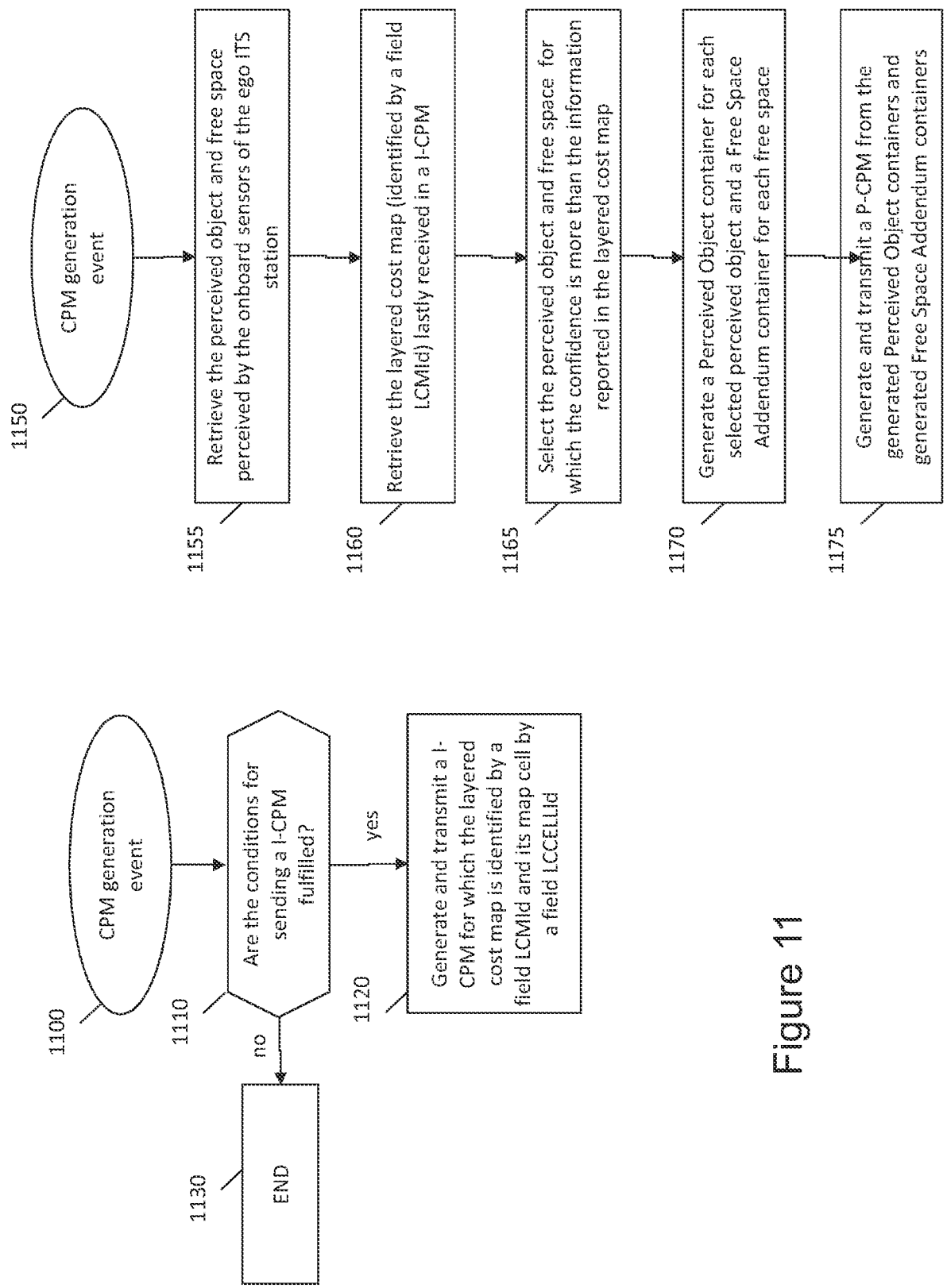
FIG. 11 illustrates a flowchart of an example of an enhanced reporting procedure involving two complementary types of reporting at transmitting stations, according to a third embodiment.

FIG. 11 illustrates a flowchart of an example of an enhanced reporting procedure involving two complementary types of reporting at transmitting stations, according to a third embodiment.

In the third embodiment, a given transmitting station is enabled to provide a more precise information using a P-CPM with an individually reported perceived object and/ free spaces after the transmitting by another ITS station of an I-CPM comprising a layered cost map providing rough information relating to a given area.

Therefore, this third embodiment enables some ITS stations to send complementary information to the one provided by a given ITS station. For example, the given ITS station may be a static station and may be embedded, for instance, in an RSU which has in general a global view of an area.

The RSU provides all the ITS stations in its vicinity with rough information relating to a given area using a layered cost map within an I-CPM. The surrounding ITS stations may provide complementary precise information, using P-CPM, when they are able to provide information having a confidence level greater than the confidence level of one or more cells of the provided layered cost map of the previous I-CPM.

Such an embodiment enables ITS stations of the vehicle to complete the information provided by the RSU of a low confidence level.

The third embodiment involves at least two ITS transmitting stations, a first ITS transmitting station and a second ITS transmitting station, at which the two following methods are performed. Of course, according to some embodiments, the second method may be performed by several second ITS transmitting stations.

At the first station, the method starts with the generation of a CPM event at step 1100.

At step 1110, it is checked whether the conditions for sending an I-CPM are fulfilled. As the I-CPMs contains at least one layered cost map, reporting conditions relate to Layered Cost Map, and more specifically Layered Cost Map Inclusion conditions are considered.

When the conditions for transmitting an I-CPM are fulfilled, an I-CPM is generated and transmitted at step 1120. The I-CPM comprises at least one Layered Cost Map Container comprising a layered cost map associated with at least one enhanced identifier.

In this embodiment, the at least one enhanced identifier is the same as the one used in the first embodiment at step 520. Therefore the at least one enhanced identifier may comprise an identifier LCMId associated with the layered cost map and optionally the identifiers, referred to as LCCELLId, linked to the map cells of the layered cost map. As explained hereinbefore, LCCELLId identifiers may be implicit.

Thus, similarly to step 520, at this step 1120, the Layered Cost Map Container generated with a field LCMId DE set to the value of the identifier LCMId in addition to with the DFs and DEs describing the Layered Cost map as detailed hereinbefore.

When the conditions for transmitting an I-CPM are not fulfilled, the method is ended at step 1130.

At the second ITS transmitting station (or at the second ITS transmitting stations), the method starts with the generation of a CPM event at step 1150.

Next, at step 1155, objects and/or free spaces perceived by the onboard sensors of the second ITS transmitting station are retrieved.

For each perceived object and/or free spaces, the following information is retrieved: the associated position, the associated kinematic, but also the object confidence and/or free spaces confidence, referred to as ObjectConfidence or FreeSpaceConfidence.

Then, at step 1160, the layered cost map of the lastly received I-CPM is retrieved together with its identifier(s), e.g. LCMId. As explained hereinbefore, each layered cost map container comprises a perGridCellConfidenceLevel DE in which the level of confidence of the cost value of each cell is indicated (refer to FIG. 1). Therefore, the confidence of each map cell of the Perceived Object Map Layer may be retrieved and referred to as CellConfidence.

Next, at step 1165, for each perceived object and/or free space, the level of confidence of the perceived object and/or free space ObjectConfidence is compared to the level of confidence CellConfidence of the cells of the layered cost map corresponding to the perceived object and/or free space.

To do that, the position of each perceived object and/or free space is compared to the position of the cells of the lastly received I-CPM. To do that, the second ITS transmitting station may use descriptive information of the area represented in the layered cost map provided within the Layered Cost Map Container, together with the provided position of the first station indicated within the Station Data Container in the received I-CPM.

According to some embodiments, the value of the ObjectConfidence may be compared to the arithmetic mean of the values of CellConfidence of the concerned map cells.

When the level of confidence of the perceived object and/or free space is better than the level of confidence of the corresponding cells, meaning that information relating to the perceived object and/or free space is more reliable than information relating to the layered cost map, then the perceived object and/or free space is selected.

Next, at step 1170, for each selected perceived object and/or free space, a Perceived Object and/or Free Space Addendum container is generated.

According to some embodiments, the generated Perceived Object and/or Free Space container(s) may comprise the identifier LCMId associated with the layered cost map of the lastly received I-CPM, together with the LCCELLId of the concerned cells.

Then, at step 1175, a P-CPM comprising the Perceived Object containers and Free Space Addendum containers generated at step 1170 are then transmitted to the first station and, when applicable, to the other second stations.

Upon receiving, both the first station and the other second stations, may update the layered cost map, using the descriptive information relating to the perceived objects and/or space. For example, with the position indicated within the Perceived Object and/or Free Space Addendum Container(s), the first station and the other second station may update the layered cost map of the last I-CPM.

According to some embodiments, the update may be performed using the LCMId identifier and the LCCELLId identifiers of the concerned cells. In this case, these stations may perform the P-CPM receiving method as described in relation to FIG. 6.

Therefore, in the third embodiment, depending on the confidence level of the objects detected by the second station, it may send more reliable information through the P-CPM to the other surrounding stations. The latter may then update the information received within the lastly received/sent I-CPM with more reliable data.

Figure 12:
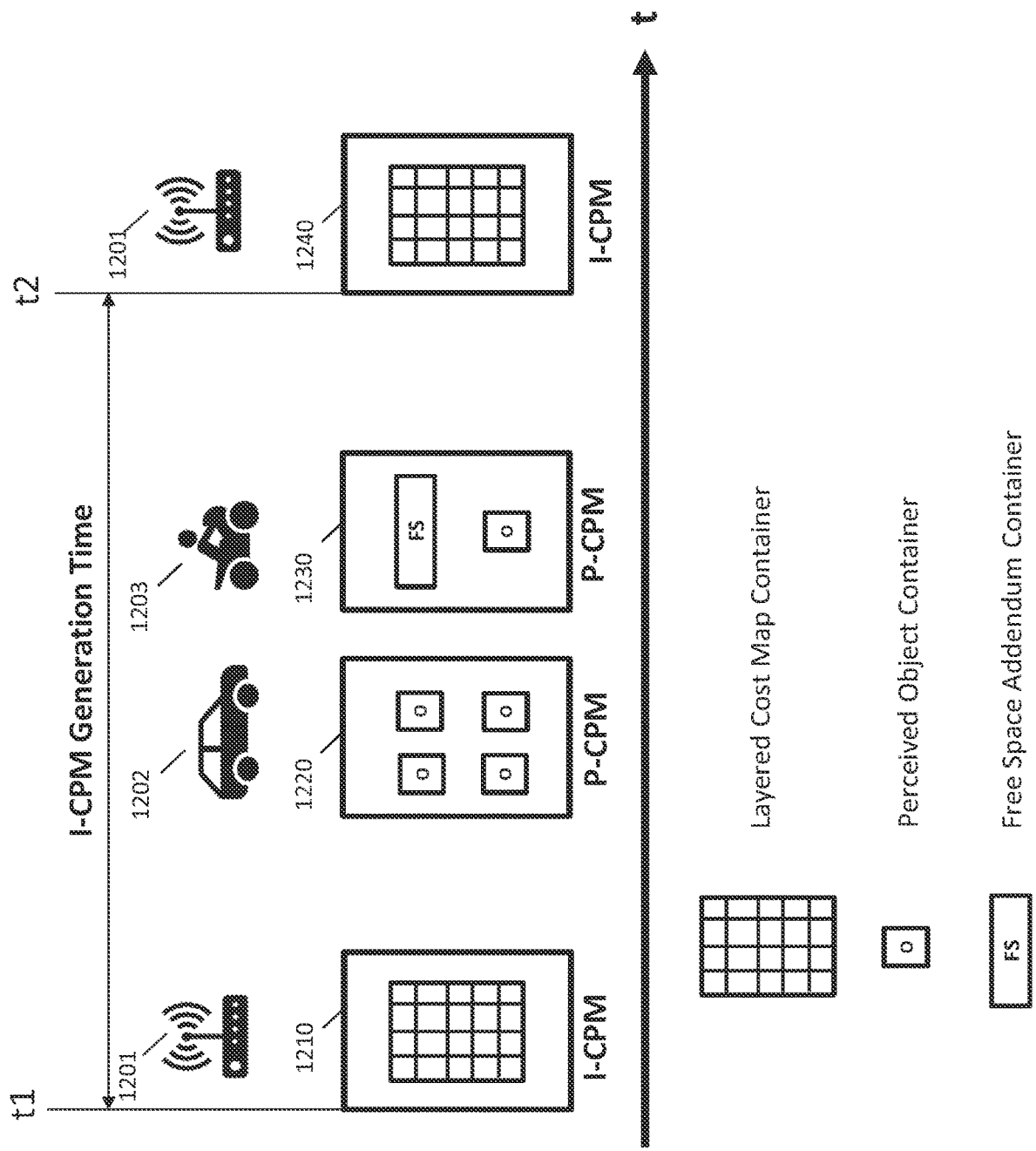
FIG. 12 illustrates the example of the enhanced reporting procedure in a Cooperative Transportation System, according to the third embodiment.

FIG. 12 illustrates the example of the enhanced reporting procedure in a Cooperative Transportation System, according to the third embodiment.

I-CPMs 1210, 1240 are sent according to the reporting policy of the I-CPM, at two successive instants t1 and t2. The period of time between these two instants may be referred to as an I-CPM Generation time.

Both I-CPMs 1210, 1240 comprises a layered cost map so that the I-CPM Generation time depends on whether the conditions for sending a I-CPM corresponding the Layered Cost Map Inclusion conditions are fulfilled, as described at step 1110.

Both I-CPM are sent by the same ITS transmitting station 1201, which may be embedded in a RSU.

During the I-CPM Generation time, i.e. the time lapse between t1 and t2, some P-CPMs may be generated in order to update the layered cost reported in the I-CPM 1210 at time t1. Such P-CPMs may be generated only if the level of confidence on the perceived by the onboard sensors is better than the level of confidence of the cells, which correspond to the perceived objects and/or free spaces, of the layered cost map lastly reported in I-CPM at time t1.

In the illustrated example, two P-CPMs 1220, 1230 are generated respectively by two other ITS transmitting stations 1202, 1203.

Each container references the layered cost map reported in the I-CPM 1210 at time t1, and the identifiers of the map cells of the layered cost map to be updated.

Figure 13:
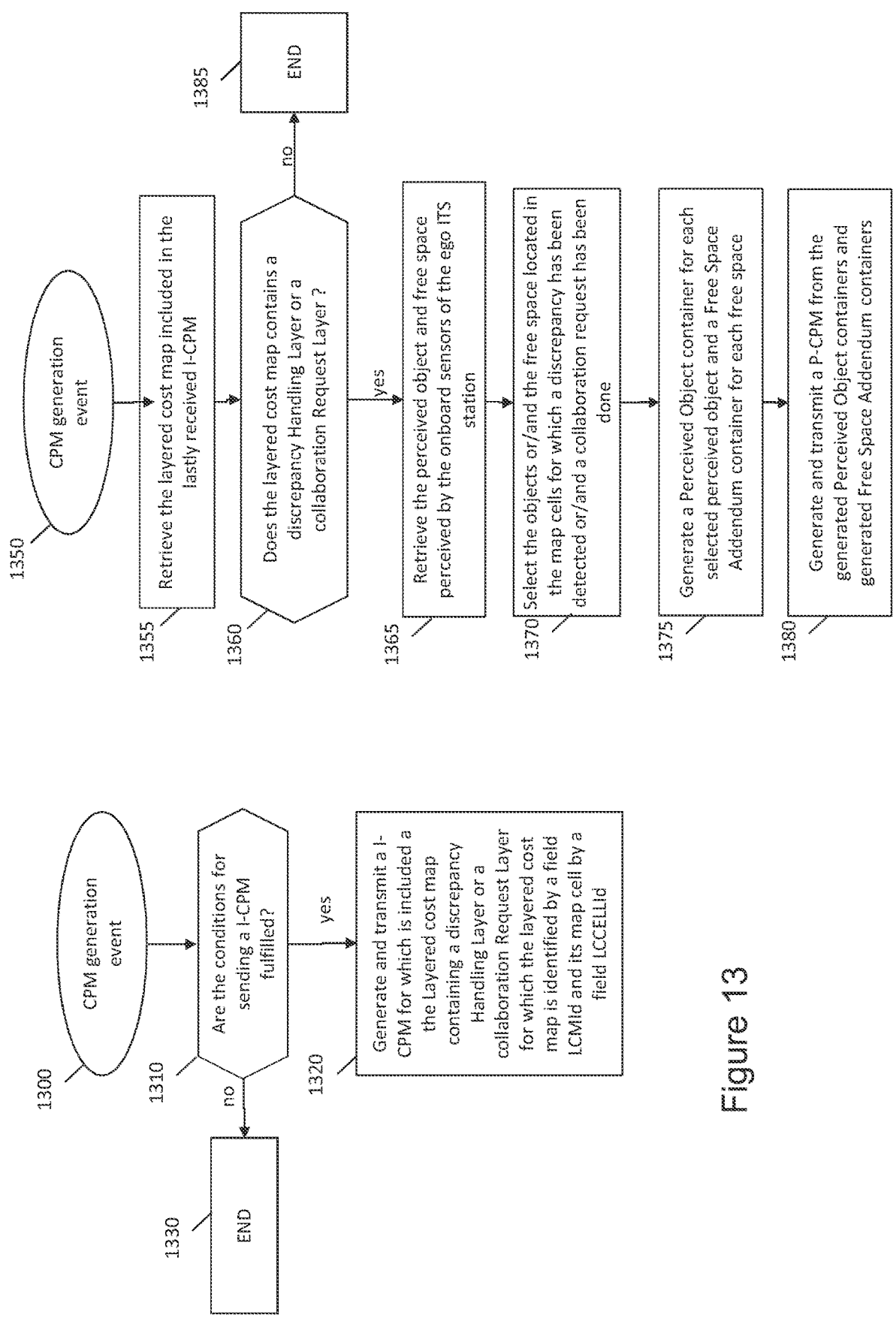
FIG. 13 illustrates a flowchart of an example of an enhanced reporting procedure involving two complementary types of reporting at transmitting stations, according to a fourth embodiment.

FIG. 13 illustrates a flowchart of an example of an enhanced reporting procedure involving two complementary types of reporting at transmitting stations, according to a fourth embodiment.

As explained hereinbefore, layered cost maps may include in some case the following layers, the Discrepancy Handling Layer or a Collaboration Request layer. In this case, the fourth embodiment provides an enhanced reporting method in which a first ITS transmitting station may request from other surrounding one or more second ITS transmitting stations more detailed information relating to cells of the layered cost map.

Such reporting is applied in case of discrepancy or the missing information at a first station willing to send I-CPM. Complementary information are then provided by the other second transmitting ITS station using P-CPMs.

At the first station, the method starts with the generation of a CPM event at step 1300.

At step 1310, it is checked whether the conditions for sending an I-CPM are fulfilled. As the I-CPMs contains at least one layered cost map, reporting conditions relates to Layered Cost Map, and more specifically Layered Cost Map Inclusion conditions are considered.

When the conditions for transmitting an I-CPM are fulfilled, an I-CPM is generated and transmitted at step 1320. The I-CPM comprises at least one Layered Cost Map Container comprising a layered cost map associated with at least one enhanced identifier.

In this embodiment, the at least one enhanced identifier is the same as that used in the first embodiment at step 1120. Therefore the at least one enhanced identifier may comprise an identifier LCMId associated with the layered cost map and optionally the identifiers, referred to as LCCELLId, linked to the map cells of the layered cost map.

Similarly to step 1120, the Layered Cost Map Container is generated with a field LCMId DE set to the value of the identifier LCMId in addition to with the DFs and DEs describing the Layered Cost map as detailed hereinbefore, The Layered Cost Map Container further comprises either a discrepancy Handling Layer or a Collaboration Request Layer.

When the conditions for transmitting an I-CPM are not fulfilled, the method is ended at step 1330.

At the second ITS transmitting station (or at the second ITS transmitting stations), the method starts at the generation of a CPM event at step 1350.

Next, at step 1355, the layered cost map of the lastly received I-CPM is retrieved together with the associated LCMId from the Layered Cost Map Container.

At step 1360, it is checked whether the layered cost map of the lastly received I-CPM comprises a discrepancy Handling Layer or a Collaboration Request Layer.

When the layered cost map of the lastly received I-CPM comprises a discrepancy Handling Layer or a Collaboration Request Layer, at step 1365, the objects and/or free spaces perceived by the onboard sensors of the second ITS transmitting station are retrieved.

Next, at step 1370, for each perceived object and/or free space, the associated cells within the layered cost map of the lastly received I-CPM are retrieved.

Thus, at step 1370, when one or more cells associated with the perceived objects and/or free spaces also correspond to cells for which a discrepancy has been detected (for example, cells having cost equal to 1 within the discrepancy Handling Layer) or/and for which a collaboration (for example, cells having cost equal to 1 within the Collaboration Request Layer) is requested, then the perceived objects and/or free spaces is selected.

To do that, the position of each perceived object and/or free space is compared to the position of the cells of the lastly received I-CPM. To do that, the second ITS transmitting station may use descriptive information of the area represented in the layered cost map provided within the Layered Cost Map Container, together with the provided position of the first station indicated within the Station Data Container in the received I-CPM.

Next, at step 1375, for each selected perceived object and/or free space, a Perceived Object and/or Free Space Addendum Container is generated.

According to some embodiments, the generated Perceived Object and/or Free Space container(s) may comprise the identifier LCMId associated with the layered cost map of the lastly received I-CPM, together with the LCCELLId of the concerned cells.

Then, at step 1380, a P-CPM comprising the Perceived Object containers and Free Space Addendum containers generated at step 1170 are then transmitted to the first station.

Upon receiving, the first station may update its layered cost map, using the descriptive information relating to the perceived objects and/or space.

The LCMId identifier and the LCCELLId identifiers of the concerned cells may be comprised in P-CPM. In this case, these stations may perform the P-CPM receiving method as described in relation to FIG. 6.

When the layered cost map of the lastly received I-CPM does not comprise a discrepancy Handling Layer or a collaboration Request Layer, then the method is ended at step 1385.

Figure 14:
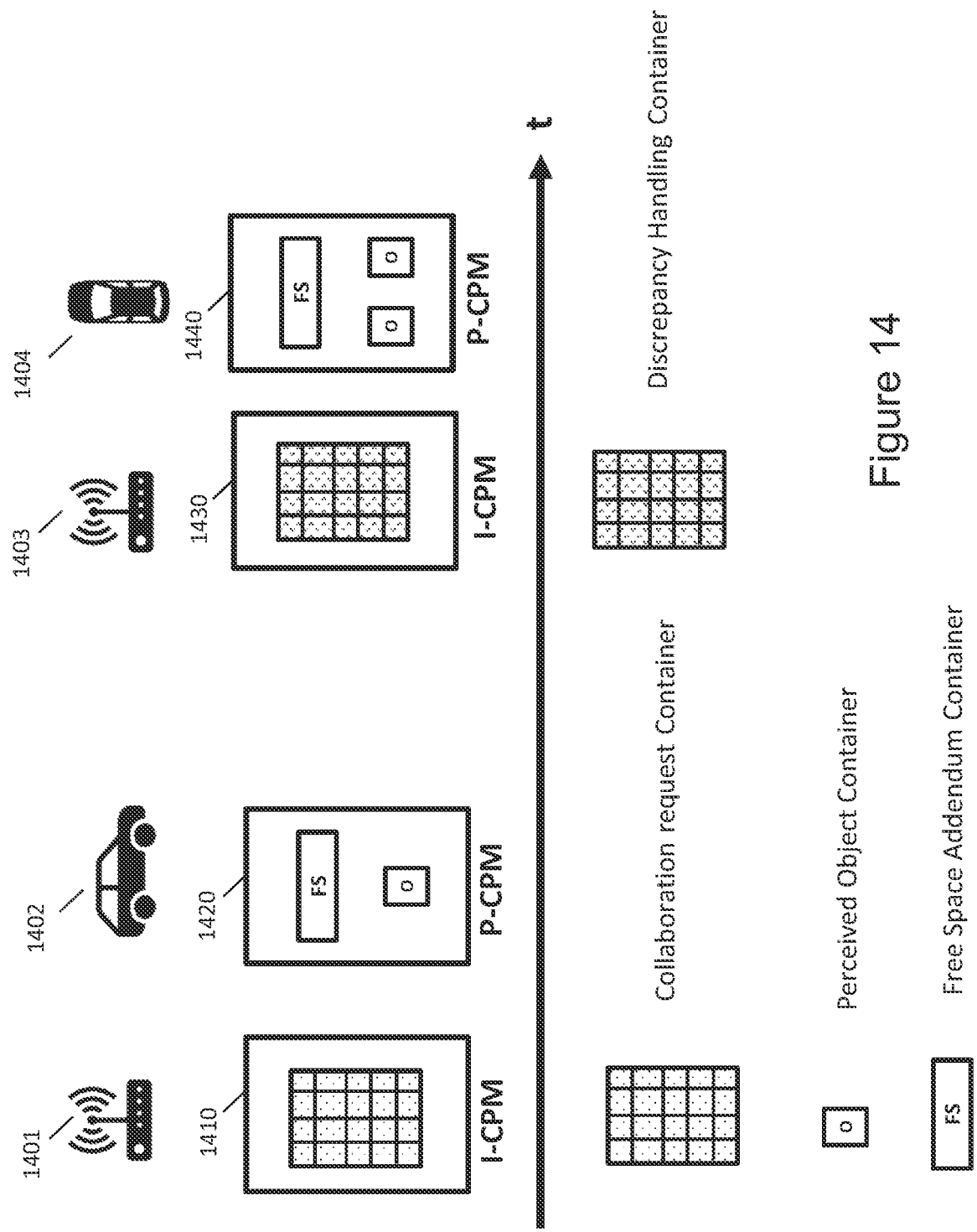
FIG. 14 illustrates the example of the enhanced reporting procedure in a Cooperative Transportation System, according to the fourth embodiment.

FIG. 14 illustrates the example of the enhanced reporting procedure in a Cooperative Transportation System, according to the fourth embodiment.

An I-CPM 1410 is sent by a first station 1401. The I-CPM 1410 contains a Collaboration Request Layer allowing the first station 1401 to request a collaboration of the surrounding station for one or more cells of the layered cost map included in the I-CPM 1410.

A second station 1402 responds to this collaboration request by sending a P-CPM comprising one or more Perceived Object/Free Space Addendum containers whose associated positions correspond to the cells for which a collaboration has been requested in the layered cost map included in the I-CPM 1410

An I-CPM 1430 is sent by a third station 1403. The I-CPM 1430 contains a Discrepancy Handling Layer allowing the first station 1401 to indicate that at least one discrepancy has been detected between its cost values of its aggregated cost map and the cost values of the aggregated cost map of at least one other station (not represented). Such a discrepancy Handling Layer allows the first station 1401 to request help from other stations.

A fourth station 1404 responds to this request by sending a P-CPM 1440 comprising one or more Perceived Object/Free Space Addendum containers whose associated positions correspond to the cells for which a discrepancy has been detected and identified in the layered cost map included in the I-CPM 1430.

The described embodiments relating to the enhanced reporting procedure provided, enable inclusion procedures to be specified when using both types of elements, not only perceived Object and Free Space Addendum Containers and, but also Layered Cost Map Container. Thus, these elements may be used in a complementary way within an enhanced reporting procedure.

According to a second aspect of the present disclosure, there are provided enhanced Layered Cost Map containers, enhanced Perceived Object containers and enhanced Free Space Addendum containers, to be comprised within a CPM.

In the Layered Cost Map Container a new enhanced field is added, an LCMId DE to identify the layered cost map within the Layered Cost Map Container. According to some embodiment, the Layered Cost Map Container may also comprise one or more LCCELLIds DE to identify the cells of the layered cost map contained within the Layered Cost Map Container.

Therefore, there is also provided an enhanced Perceived Object container and the enhanced Free Space Addendum Container, in which a new enhanced field is added, a LCMId DE. In the LCMId DE it is now possible to refer to a layered cost map reported in a previous CPM. Further, the enhanced Perceived Object container and the enhanced Free Space Addendum Container may further comprise an LCCELLIds DE in order to reference a list of map cells in a previously reported layered cost map.

Examples of use of such enhanced Perceived Object containers and Free Space Addendum container is described hereinbefore in relation to the first embodiment.

A field FreeSpaceID DE may be added in an enhanced Free Space Addendum Container in order to identify a perceived free space. Similarly, a field objectID DE may be added in the Perceived Object container in order to identify a perceived object.

Therefore, there is also provided an enhanced Layered Cost Map Container comprising a new field within the existing PerGridCellCostMapValueWithConfidenceLevel DF. Such new field ObjectsLstID DE then enables referencing of a list of perceived objects (using the objectID) or perceived free areas (using the FreeSpaceID) of a previously sent I-CPM.

Although the present disclosure has been described hereinabove with reference to specific embodiments, the present disclosure is not limited to the specific embodiments, and modifications will be apparent to a person skilled in the art which lie within the scope of the present disclosure.

Many further modifications and variations will suggest themselves to those versed in the art upon making reference to the foregoing illustrative embodiments, which are given by way of example only and which are not intended to limit the scope of the present disclosure, that being determined solely by the appended claims. In particular, the different features from different embodiments may be interchanged, where appropriate.

Each of the embodiments of the present disclosure described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method for improving communication in an Intelligent Transport System (ITS) comprising at least one first transmitting ITS station and at least one first receiving ITS station, the method comprising at the first transmitting ITS station:

transmitting a second Collective Perception Message (CPM) comprising at least one identifier of a first element previously transmitted in a first CPM, the first element being not present in the second CPM, wherein the first element is of a first element type and the second CPM comprises a second element of a second element type, the second element comprising the identifier of the first element and information related to the first element to update the first element, the first and the second element being representative of a perceived object and/or of a perception region, and wherein the perceived object and/or the perception region of the first element notified by the first CPM is updated by the perceived object and/or the perception region of the second element notified by the second CPM.

2. The communication method according to claim 1, wherein one among the first and the second element types provides a global description of an area of interest and the other element type provides an individual description of at least one object perceived by the first transmitting ITS station within the area of interest.

3. The communication method according to claim 2, wherein the type of element providing the global description of the area of interest is a layered cost map container, and wherein the type of element providing an individual description is a perceived object container and/or a free space addendum container.

4. The communication method according to claim 1, wherein the first CPM is transmitted by the first transmitting ITS station.

5. The communication method according to claim 4, wherein the first element is a layered cost map container comprising a layered cost map, the layered cost map being regularly divided into cells having associated cost values.

6. The communication method according to claim 1, wherein the first CPM is transmitted by a second transmitting ITS station of the ITS.

7. The communication method according to claim 1, wherein the transmitting of one or more first CPM is implemented according to an independent reporting mechanism given by a predetermined reporting policy and a predetermined inclusion procedure.

8. The communication method according to claim 7, wherein the first element is a layered cost map container comprising a layered cost map, the layered cost map being regularly divided into cells having associated cost values, and wherein the layered cost map comprises either a Discrepancy Handling Layer indicating discrepancies of one or more cost values with a previously received layered cost map from another transmitting ITS station, or a Collaboration Request Layer requesting collaboration from other ITS transmitting stations for determining at least one cost value of the layered cost map.

9. The communication method according to claim 8, wherein each cost value is associated with a confidence level, the communication method comprising at the first transmitting ITS station:
- receiving, from a second transmitting ITS station, the first CPM;
- whether the first element comprises either the Discrepancy Handling Layer or the Collaboration Request Layer, retrieving at least one perceived object and/or at least one free space perceived by sensors of the first transmitting ITS station;
- identifying the retrieved perceived object and/or free space which has a same location as cells for which discrepancy is indicated in the Discrepancy Handling Layer or for which a collaboration is requested in the Collaboration Request Layer;
- transmitting a second CPM including a second element relating to the identified at least one perceived object and/or the at least one free space associated with the at least one identifier.

10. The communication method according to claim 1, wherein the transmitting of one or more second CPM is implemented according to a dependent reporting mechanism given by a reporting policy and an inclusion procedure, the dependent reporting mechanism being dependent on a previously transmitted first CPM.

11. The communication method according to claim 1, wherein the first element is either a perceived object container or a free space container and the second element is a layered cost map container.

12. The communication method according to claim 1, wherein the first element is a layered cost map container and the second element is either a perceived object container or a free space container.

13. A non-transitory computer-readable storage medium storing instructions of a computer program for implementing a method according to claim 1.

14. A transmitting station of an Intelligent Transport System, ITS, the station comprising a processor configured to:
- transmitting a second Collective Perception Message (CPM) comprising at least one identifier of first element previously transmitted in a first CPM and not present in the second CPM,
- wherein the first element is of a first element type and the second CPM comprises a second element of a second element type, the second element comprising the identifier of the first element and information related to the first element to update the first element, the first and the second element being representative of a perceived object and/or of a perception region, and
- wherein the perceived object and/or the perception region of the first element notified by the first CPM is updated by the perceived object and/or the perception region of the second element notified by the second CPM.

* * * * *